US011901627B2

(12) United States Patent
Zheng et al.

(10) Patent No.: US 11,901,627 B2
(45) Date of Patent: Feb. 13, 2024

(54) ELECTROMAGNETIC LENS, METHOD FOR PRODUCING ELECTROMAGNETIC LENS, AND LENS ANTENNA

(71) Applicant: FOSHAN EAHISON COMMUNICATION CO., LTD., Foshan (CN)

(72) Inventors: Hongzhen Zheng, Foshan (CN); Yongchao Lu, Foshan (CN); Yaozhi Sun, Foshan (CN); Jiaduo Li, Foshan (CN); Tao Li, Foshan (CN)

(73) Assignee: FOSHAN EAHISON COMMUNICATION CO., LTD., Foshan (CN)

( * ) Notice: Subject to any disclaimer, the term of this patent is extended or adjusted under 35 U.S.C. 154(b) by 0 days.

(21) Appl. No.: 18/259,543

(22) PCT Filed: May 23, 2022

(86) PCT No.: PCT/CN2022/094314

§ 371 (c)(1),
(2) Date: Jun. 27, 2023

(87) PCT Pub. No.: WO2023/005373

PCT Pub. Date: Feb. 2, 2023

(65) Prior Publication Data

US 2023/0395985 A1 Dec. 7, 2023

(30) Foreign Application Priority Data

Jul. 29, 2021 (CN) ......................... 202110860941.2

(51) Int. Cl.
*H01Q 15/08* (2006.01)
*H01Q 19/06* (2006.01)

(52) U.S. Cl.
CPC ............ *H01Q 15/08* (2013.01); *H01Q 19/06* (2013.01)

(58) Field of Classification Search
CPC ........ H01Q 15/02; H01Q 15/08; H01Q 19/06; H01Q 19/062; H01Q 19/09
See application file for complete search history.

(56) References Cited

U.S. PATENT DOCUMENTS 3,116,486 A * 12/1963 Johnson ................ H01Q 15/02 343/755
4,297,709 A * 10/1981 Cassel .................... H01Q 15/08 343/754

(Continued)

FOREIGN PATENT DOCUMENTS

CN 106207482 A 12/2016
CN 111244640 A 6/2020

(Continued)

OTHER PUBLICATIONS

International Seach Report issued in corresponding PCT Application No. PCT/CN2022/094314, dated Aug. 18, 2022.

(Continued)

*Primary Examiner* — Tho G Phan
(74) *Attorney, Agent, or Firm* — Westbridge IP LLC

(57) ABSTRACT

The present invention provides a better electromagnetic lens, a method for producing it and a lens antenna. The electromagnetic lens is a winded body made of a strip material. The dielectric constant of a dielectric material gradually changes in both a transverse direction and a longitudinal direction of the strip material. After the strip material is winded to be a winded body, the dielectric material is distributed in at least one artificially predetermined three-dimensional space range called a lens body inside the winded body. A part of the winded body besides (Continued)

A-A the lens body is called a non-lens part. The dielectric constant of the lens body is not lower than that the dielectric constant of the non-lens part.

22 Claims, 23 Drawing Sheets

(56) References Cited

U.S. PATENT DOCUMENTS

| | | | | |
|---|---|---|---|---|
| 4,804,970 | A * | 2/1989 | Todd | H01Q 15/08 264/2.3 |
| 10,224,638 | B2 * | 3/2019 | Artemenko | H01Q 15/08 |
| 10,992,052 | B2 * | 4/2021 | Kratzenberg | H01Q 13/02 |
| 11,217,900 | B2 * | 1/2022 | Lin | H01Q 1/243 |
| 11,283,186 | B2 * | 3/2022 | Galla | H01Q 15/10 |
| 2020/0136262 | A1 | 4/2020 | Nishida et al. | |

FOREIGN PATENT DOCUMENTS

| | | | |
|---|---|---|---|
| CN | 112662060 | A | 4/2021 |
| CN | 113314855 | A | 8/2021 |

OTHER PUBLICATIONS

Written Opinion issued in corresponding PCT Application No. PCT/CN2022/094314, dated Aug. 18, 2022.

* cited by examiner

ELECTROMAGNETIC LENS, METHOD FOR PRODUCING ELECTROMAGNETIC LENS, AND LENS ANTENNA

CROSS-REFERENCE TO RELATED APPLICATIONS

This application is the National Stage of International Application No. PCT/CN2022/094314, filed on May 23, 2022, which claims priority to Chinese Patent Application No. 202110860941.2, filed on Jul. 29, 2021. All of the aforementioned applications are incorporated herein by reference in their entireties.

TECHNICAL FIELD

The present invention relates to the field of communication device production, and more specifically to an electromagnetic lens, a method for producing an electromagnetic lens, and an electromagnetic lens antenna.

BACKGROUND

A Luneburg lens, proposed by RK Luneberg in 1944 based on the geometric optics, is applied to an antennas and scatterer, and mainly used in the fields of fast scanning system, satellite communication system, automotive anti-collision radar, radar reflector, and etc.

A classical model of a Luneberg lens is as follows: from a spherical center of the Luneberg lens to an outer diameter of it, the dielectric constant of the Luneberg lens should continuously change from 2 to 1 according to a certain mathematical law. However, such an ideal structure does not exist in nature. Accordingly, in practical design, a layered structure with step changes in dielectric constant is often used to approximate the theoretical structure.

In the conventional art, the layered structure with step changes in dielectric constant can be roughly divided into the following three types: the first type is a wrapped type; the second type is a winded type; and the third type is a hole type. These different structures have distinct disadvantages and advantages.

SUMMARY

The production of a wrapped-type structure usually requires to use a mold. If there are too many layers, the process becomes too complicated and expensive, and the consistency of performance of different individuals is usually poor.

It is easy to make a winded-type structure having a plurality of layers. However, in the conventional art, the winded-type structure can only be made to have a form of a cylinder or an elliptical cylinder rather than a sphere of the classical model. Since both a cylinder and an elliptical cylinder are not in conformity to the theory of the classical model in the direction of central axis, their performance effect is greatly reduced. Accordingly, neither of them can meet the performance requirements of many scenarios.

A hole-type structure is usually made by 3D printing. However, a 3D printed structure is usually of a single thermo-melting material. The existing thermo-melting materials suitable for 3D printing either have inappropriate dielectric constants or have a density that is not low enough, and their weight is considerable and cause various difficulties in mounting and use in the case that a large lens is to be manufactured.

The Chinese patent document No. CN111262042B discloses "Method for Manufacturing Artificial Dielectric Multilayer Cylindrical Lens", which is related to a winded-type structure. The lens produced with the manufacturing method has disadvantages of the above winded-type structure.

In order to obtain a Luneberg lens product having a higher production efficiency, a lower cost, a lighter weight, a better performance index and a better consistency of performance, it is necessary to improve the existing product structure and production method.

In order to solve advantages existing in the conventional art, the present invention provides a better electromagnetic lens, method for producing the electromagnetic lens, and lens antenna.

A following technical solution is adopted.

An electromagnetic lens is provided, wherein the electromagnetic lens is, in particular, a winded body made of a strip material; a dielectric material is distributed on a surface of and/or inside the strip material, and a dielectric constant of the dielectric material gradually changes in both a transverse direction and a longitudinal direction of the strip material; after the strip material is winded to be the winded body, the dielectric material is distributed in at least one artificially predetermined three-dimensional space range inside the winded body, and the three-dimensional space range with the dielectric material distributed is called a lens body; a part of the winded body besides the lens body is called a non-lens part; the winded body has or does not have the non-lens part; the dielectric constant of the lens body is not lower than the dielectric constant of the non-lens part; the dielectric constant of the lens body gets lower and lower in all directions from inside to outside of the lens body, and each direction from inside to outside of the lens body indicates a direction from a central area of the lens body to a boundary of the lens body.

Through the above technical solution, one or more lens bodies can be obtained in a single winding operation, and these lens bodies conform to a law as follows: the dielectric constant of each lens body gets lower and lower from inside to outside of the lens body. As such, the lens body acts on electromagnetic waves in more than one direction, rather than being confined to a certain direction. The winding mentioned in the present invention refers to spiral winding.

The winded body may be provided with one or two or more lens bodies. In the case that the electromagnetic lens includes only one lens body, a central axis of the lens body may coincide with or is parallel to a central axis of the winded body. In the case that the electromagnetic lens includes two or more lens bodies, these lens bodies may be arranged along or parallel to the central axis of the winded body. In addition, in the case that the electromagnetic lens includes two or more lens bodies, these lens bodies may also be arranged in a circumferential direction of the winded body.

The lens body has a volume of 500 $mm^3$ to 2 $m^3$.

The strip material has a constant thickness of 0.01 mm to 15 mm. The strip material may also have a non-constant thickness, for example, a winding starting part and a winding finishing part of the strip material are thinner than other parts. A thinner winding starting part is helpful to avoid the production of a large cast tubular cavity in the center of the winded body during winding, and even if a tubular cavity is produced, it is also helpful to avoid the production of obvious steps in the circumferential direction inside the tubular cavity. A thinner winding finishing part is helpful to avoid the production of obvious steps at the circumferential periphery of the winded body.

The strip material may have a constant or non-constant width. The strip material having a non-constant width may be winded to be a winded body in a form of a capsule-shaped cylinder or sphere.

The strip material is preferably made of a lightweight foaming material, the foaming material may have a density of 0.005-0.1 g/cm$^3$, and the closer its dielectric constant is to 1, the better.

However, when a thicker strip material is needed for use, in order to reduce the difficulty of winding, a large radius may be used when winding; a tubular cavity is pre-provided in a central part of the cross section of the winded body, and the tubular cavity is filled with a rod-shaped part; in the case that the rod-shaped part has to pass through the lens body, a part of the rod-shaped part passing through the lens body has a dielectric constant distribution matching the lens body; in this case, the matching means that it does not lead to excessive deterioration of the electrical performance of the lens body. Or, a central part of the winded body is provided with a shaft for taking-up and winding the strip material, and a central axis of the shaft coincides with or almost coincides with a central axis of the winded body; in the case that the shaft has to pass through the lens body, it is better to for a part of the shaft passing through the lens body to have a dielectric constant distribution matching the lens body; in this case, the matching means that it does not lead to excessive deterioration of the electrical performance of the lens body. In this case, the shaft should generally have sufficient rigidity to ensure that the strip material will not become loose and irregular due to the runout of the shaft in the process of winding the strip material to be the winded body. The shaft may be made of a high dielectric constant material and have a cavity structure at a target part to reduce a relative dielectric constant of the target part. The cavity structure is a hole formed by a material removal process, or a material-free space preplanned during 3D printing of the shaft. The diameter of the rod-shaped part and the shaft is generally as small as possible, thereby reducing the impact on the electromagnetic performance of the lens body. In addition, both ends of the rod-shaped part and the shaft can be taken as fixed ends of the electromagnetic lens of the present invention for mechanical connection with a lens holder, without additional consideration of a connection structure between the lens and the lens holder.

The winded body may be in a form of a cylinder, an elliptical cylinder, a prism, a capsule-shaped cylinder, a sphere or a tube.

The lens body may be in a form of a sphere, a rugby ball, a cylinder or a prism. The shape of the lens body may be the same as or different from the shape of the winded body.

In addition, in the case that the electromagnetic lens includes two or more lens bodies, these lens bodies are of different sizes from each other, and these lens bodies may also of different shapes from each other. For example, there are two spherical lens bodies with different sizes formed in one winded body; for another example, there is a spherical lens body and a cylindrical lens body formed in one winded body.

The winded body has n winding layers, where $3 \leq n \leq 2000$.

The dielectric material may be distributed on one or two surfaces of the strip material, and may also enter from one or two surfaces of the strip material to be distributed inside the strip material.

The dielectric material may be a sheet having a specific/unspecific shape or a fiber having a specific length, or a three-dimensional part having a specific/unspecific shape. The sheet may be formed by cutting, stamping, printing, imprinting, or etching. Cutting and stamping generally refer to cutting a whole sheet of dielectric material into small-sized sheets. Printing and imprinting generally refer to using a corresponding device to spray a liquid dielectric material to a target position and then make it cure to obtain a sheet. Etching generally refers to using an etching device to remove undesired material from a whole sheet of material with a substrate layer, leaving only the substrate layer and a desired sheet with a target shape. The substrate layer here is of low dielectric constant, while the removed material is of high dielectric constant.

The dielectric material may be directly attached to the surface of the strip material; or the dielectric material is first attached to a low dielectric constant film, and then the film is attached to the surface of the strip material. The structure is especially applicable to a situation where the dielectric material is a sheet having a specific/unspecific shape, and may also be applicable to a situation where the dielectric material is a fiber having a specific length. In addition, it is cost-effective to print or imprint corresponding numerous sheets with a specific/unspecific shape on different specific areas on the low dielectric constant film, and then wind such a film before adhering it to the surface of the strip material. In addition, such a film may be adhered to the surface of the strip material after being divided into multiple segments in a longitudinal direction or a transverse direction of the strip material. This is equivalent to using a narrow printer or imprinter to complete the fixation of the dielectric material to a narrow film, and then splicing the narrow film into a desired wide film body along the longitudinal direction or transverse direction of the strip material.

In the case that the dielectric material is a fiber having a specific length or a three-dimensional part having a specific/unspecific shape, the dielectric material may also be wholly or partially inserted or embedded in the strip material. The three-dimensional part having a specific shape may be a solid three-dimensional part, a hollow three-dimensional part or a three-dimensional part in a frame form. The three-dimensional part may be in a form of a sphere, a cube or a cylinder. The three-dimensional part having an unspecific shape may be broken fine particles, such as broken ores, and these ores may be screened into different particle sizes for utilization.

In the case that the lens body is in a form of a sphere, the distribution of the dielectric material in the whole lens body is better to conform to a step approximation law of a classical model of a Luneberg lens.

The winded body may be formed by winding a piece of strip material from one end or middle of the piece of strip material. The structure of the latter may reduce the number of winding turns without changing the number of winding layers, thereby improving the production efficiency.

The winded body may be formed by combining two or more pieces of strip materials at their respective ends and then winding them at a same time, or by combining two or more pieces of strip materials at their respective central parts and then winding them at a same time. Such a structure may also reduce the number of winding turns without changing the number of winding layers.

The strip material is preferably not connected with other strip material in the longitudinal direction, so that the structure and performance of a product will be more stable and controllable. However, sometimes it is necessary to connect the strip material with another strip material because the lens body has a relatively large volume, causing the length of a single strip material is insufficient. Although this case is not optimal, the structure and performance deficiencies caused by it are not necessarily unacceptable, so a connection between one strip material and another strip material in the longitudinal direction is allowed to a certain extent, and the structure of the connection is considered to be equivalent to the structure of a whole strip material. In addition, regardless of whether one strip material is connected with another strip material in the longitudinal direction, the width of the strip material should not be less than the maximum overall dimensions of a single lens body, otherwise the lens body is equivalent to not being winded once, and the structure and performance deficiencies caused by this are likely to be unacceptable.

The dielectric materials may be distributed inside the lens body according to a material distribution law, a density distribution law, or a combination of the material distribution law and the density distribution law. The material distribution law refers to that when two or more dielectric materials are used, the dielectric material having a higher dielectric constant is closer to the central area of the lens body. It is to be noted that the material distribution law also includes a situation where there is a dielectric constant value in transition due to the mixing of different dielectric materials; in this case, the dielectric constant of a mixture is lower than the dielectric constant of a single material in the mixture having a high dielectric constant and greater than the dielectric constant of a single material in the mixture having a low dielectric constant, and the dielectric constant can be controlled by controlling the proportions of different materials in the mixture. The position where a mixture having a higher dielectric constant is distributed will be closer to the central area of the lens body than the position where a mixture having a lower dielectric constant is distributed, and in the mixture having a higher dielectric constant, the proportion of the material having a higher dielectric constant is also higher, so it can still be understood that the dielectric material having a higher dielectric constant is closer to the central area of the lens body. The density distribution law refers to that the closer to the center area of the lens body, the higher the distribution density of the dielectric material; the distribution density refers to a ratio between the number of dielectric materials and the unit volume in the lens body, or a ratio between the weight of the dielectric material and the unit volume in the lens body. With the material distribution law or the density distribution law, or a combination of the material distribution law and the density distribution law, an effect that, the dielectric constant gets lower and lower in all the directions from the inside to the outside of the lens body can be realized.

It is to be noted that in the case that there is only one lens body provided in the winded body, the winded body is formed by winding the strip material from one end of the strip material, and the central axis of the lens body coincides with the central axis of the winded body. If the strip material is unwinded, it can be seen that the dielectric material is distributed on a specific plane area of the strip material, and such a specific plane area is called a dielectric distribution area; in this case, the length of the dielectric distribution area is usually much longer than its width. The length of the dielectric distribution area refers to the length in the longitudinal direction of the strip material, and the width of the dielectric distribution area refers to the length in the transverse direction of the strip material. In the dielectric distribution area, the dielectric constant of the dielectric material changes gradually in both the transverse direction and the longitudinal direction of the strip material, which is different from that the dielectric constant changes gradually only in the longitudinal direction of the strip material as recorded in the Chinese patent document No. CN111262042B. In the case that there are multiple lens bodies provided in the winded body, the winded body is formed by winding the strip material from one end of the strip material, and the central axis of each of these lens bodies coincides with the central axis of the winded body. If the strip material is unwinded, a corresponding number of dielectric distribution areas to the lens bodies can be seen; in this case, for a single dielectric distribution area, the distribution of dielectric in the area is the same as that in the case of only a single lens body. In the case that there is only one lens body in the winded body, the winded body is formed by winding the strip material from the middle of the strip material, and the central axis of the lens body coincides with the central axis of the winded body. There are two dielectric distribution areas on the strip material, the two dielectric distribution areas are symmetrically distributed, and they may or may not be connected. In the case that there are two or more lens bodies provided in the winded body, the winded body is formed by combining two or more piece of strip materials at their respective ends and then winding them at a same time or is formed by combining two or more piece of strip materials at their respective central parts and then winding them at a same time, and the central axis of the lens body coincides with the central axis of the winded body. It is equivalent to that there are twice as many dielectric distribution areas on the strip material as there are lens bodies, every two dielectric distribution areas are symmetrically distributed, and each pair of dielectric distribution areas may or may not be connected.

It is to be further noted that because it is difficult to achieve a continuous monotonic gradual change of the dielectric constant, a way of step monotonic gradual change may be used instead. If the number of steps is large enough, the effect of continuous monotonic gradual change can be very approximated. When the way is reflected in the structure of the electromagnetic lens of the present invention, that is, the lens body is divided into a number of dielectric constant step layers; a dielectric constant step layer having a higher dielectric constant value completely wraps the dielectric constant step layer having a lower dielectric constant value; respective dielectric constant values of adjacent dielectric constant step layers are stepped; and the dielectric constant of the lens body decreases in a step manner in a direction from inside to outside of the lens body, which is equivalent to forming, in the lens body, a multilayer wrapped structure with a lower and lower dielectric constant from inside to outside of the lens body. When the way of step monotonic gradual change is reflected in the structure of the strip material of the present invention, that is, the dielectric distribution area is divided into a number of sub-distribution areas, and the sub-distribution area having a higher dielectric constant is half or fully surrounded by a sub-distribution area having a lower dielectric constant; when the strip material is winded from a sub-distribution area having a highest dielectric constant, each sub-distribution area corresponds to a dielectric constant step layer of the resulting lens body. Because under the same target outside diameter, the thinner the strip material is, the more number of winding layers of the winded body can be obtained, and the more number of winding layers means that the number of divisible dielectric constant step layers is also more, which makes it easier to control the target property of the lens body, for example, the lens body of the present invention may even approximate step by step the electromagnetic property of the classical model of the Luneberg lens with more than 50 dielectric constant step layers. It is to be noted that although the number of dielectric constant step layers of the lens body in the present invention is not greater than the number of winding layers n of the winded body, it is not necessarily equal to the number of winding layers n of the winded body.

In the case that there is only one lens body provided in the winded body and the winded body is formed by winding the strip material from one end of the strip material, and the central axis of the lens body coincides with the central axis of the winded body, it is preferred for the dielectric distribution area to have the following layout: that is, the dielectric distribution area includes one triangular area and a number of V-shaped areas; these V-shaped areas have different sizes, but they all have the same direction and are all arranged along the longitudinal direction of the strip material; the smaller V-shaped area is half surrounded by the larger V-shaped area, and the triangular area is half surrounded by the smallest V-shaped area; the dielectric constant of the triangular area is the highest, and the farther away the V-shaped area is from the triangular area, the lower its dielectric constant. This form of layout of the dielectric distribution area is called a triangular form in the present invention, and the end where the triangular area is located is a starting end. The strip material of the dielectric distribution area with the triangular form can form a lens body in the shape of a sphere or rugby ball inside the winded body after being winded from the starting end of the triangular form. The form depends on a ratio between the length and the width of the largest V-shaped area.

In the case that there is only one lens body provided in the winded body and the winded body is formed by winding the strip material from one end of the strip material, and the central axis of the lens body coincides with the central axis of the winded body, the dielectric distribution area may have the following layout: that is, the dielectric distribution area includes a rectangular area and a number of U-shaped areas; these U-shaped areas have different sizes, but they all have the same direction and are all arranged along the longitudinal direction of the strip material; the smaller U-shaped area is half surrounded by the larger U-shaped area, and the rectangular area is half surrounded by the smallest U-shaped area; the dielectric constant of the rectangular area is the highest, and the farther away the U-shaped area is from the rectangular area, the lower its dielectric constant; the U-shaped bottom of the U-shaped area includes both a semicircular bottom and a flat bottom. This form of layout of the dielectric distribution area is called a rectangular form in the present invention, and the end where the rectangular area is located is a starting end. The strip material of the dielectric distribution area with the rectangular form can form a lens body in the shape of a cylinder inside the winded body after being winded from the starting end of the rectangular form. Whether the form will be stubby or elongated depends on a ratio between the length and the width of the largest U-shaped area.

In the cased that there is a plurality of spherical lens bodies provided in the winded body, the winded body is formed by winding the strip material from one end of the strip material, and the respective central axes of these spherical lens bodies coincide with the central axis of the winded body, a corresponding number of dielectric distribution areas in a form of a triangular can be seen if the strip material is unwinded. When the sizes of these spherical lens bodies are different, the lengths of the dielectric distribution areas in the triangular form are different too.

In order to prevent the winded body from loosing automatically, there may be an adhesive layer between the winding layers of the winded body, or a wrapping layer is provided outside the winded body. The wrapping layer may be heat-shrinkable. According to the Chinese patent document No. CN111262042B, a lens manufacturing method is limited to manufacturing a cylinder lens or an elliptical cylinder lens whose shape is formed naturally by winding a strip material having a constant width.

Although the present electromagnetic lens and the lens obtained by the lens manufacturing method in the Chinese patent document No. CN111262042B are both winded lenses, 1) the dielectric constant of the dielectric material of the present lens gradually changes in both the transverse direction and the longitudinal direction of the strip material, so that inside the lens body, the dielectric constant gets lower and lower in all the directions from the inside to the outside, while the Chinese patent document No. CN111262042B records that the dielectric constant gets lower and lower only along the radial direction of the cylinder lens or the elliptical cylinder lens, and the dielectric constant does not change along the axis of the cylinder lens or the elliptical cylinder lens; 2) relative to the Chinese patent document No. CN111262042B, the shape of the lens body of the present invention is not determined by the shape formed naturally after the strip material is winded, but artificially predetermined, so when the shape of the winded body is a cylinder, the shape of the lens body may be a sphere or prism but not necessarily a cylinder; when the lens body in the present invention is a sphere, the present invention can be more accordant with the classical model of the Luneberg lens, so as to obtain the most ideal effect; image that there are one, two or even more Luneberg lens bodies more accordant with the classical model in a cylindrical winded body made by winding, which is a technical effect that cannot be obtained by the lens manufacturing method in the Chinese patent document No. CN111262042B; 3) the number of layers included by the cylinder of the cylinder lens recorded in the Chinese patent document No. CN111262042B is n, so the number of areas divided on its substrate is also n; because there are high dielectric constant particle materials with different dielectric constant values distributed in different areas, it is equivalent to limiting that the number of dielectric constant step layers from the inside to the outside of the cylinder lens is equal to the number of winding layers of the cylinder; however, in practical applications, a mechanical diameter of the electromagnetic lens is related to an operating frequency of an oscillator, and when the operating frequency of the oscillator is low, it means that the mechanical diameter of the corresponding electromagnetic lens is large; in this case, it is sometimes difficult to balance the number of dielectric constant step layers of the cylinder lens, the number of winding layers of the cylinder, and the mechanical diameter of the cylinder lens. For example, 21 dielectric constant step layers are designed for a certain cylinder lens, and a calculated dielectric constant step value of each layer is 0.05; it is not easy to prepare such 21 kinds of high dielectric constant particle materials, and the number of winding layers of the cylinder lens in this case is only 21; for a cylinder lens with a target mechanical diameter of 1000 mm, the thickness of the substrate needs to be about 24 mm, but it is not easy to winding the 24 mm thick substrate having a small curvature radius, which usually leaves a tubular cavity with a large inside diameter in the middle of the cross section of the cylinder lens; in this case, even if the above way of filling a rod-shaped part is adopted, the influence on operating characteristic of the cylinder lens is relatively large.

The present invention also provides a method for producing an electromagnetic lens, which specifically includes the following steps.

A corresponding dielectric distribution area is arranged for each lens body on a strip material. For a dielectric distribution area belonging to a same lens body, in a longitudinal direction of the strip material, a dielectric material is distributed in a way that a dielectric constant changes monotonically, and in a transverse direction of the strip material, the dielectric material is distributed in a way that the dielectric constant is higher in the middle and monotonically decreases to two sides.

In the longitudinal direction of the strip material, the strip material is winded from an end of the strip material having a higher dielectric constant until all the dielectric distribution areas are winded into the strip material and each dielectric distribution area thus forms a corresponding artificially predetermined three-dimensional lens body inside a resulting winded body. The end of the strip material having a higher dielectric constant is also a solid end of the strip material.

Each winding layer is fixed during or after the winding process.

The present invention also provides another method for producing an electromagnetic lens, which specifically includes the following steps.

A corresponding dielectric distribution area is arranged for each lens body on a strip material. For a dielectric distribution area belonging to a same lens body, in a longitudinal direction of the strip material, a dielectric material is distributed in a way that the dielectric constant is higher in the middle and monotonically decreases to two sides, and in a transverse direction of the strip material, the dielectric material is distributed in a way that the dielectric constant is higher in the middle and monotonically decreases to two sides. Centers of the dielectric distribution areas belonging to different lens bodies all cross an axis called a winding starting axis, and winding starting axis is vertical to the longitudinal direction of the strip material. A center of a dielectric distribution area refers to a position point having a highest dielectric constant in both the longitudinal direction and the transverse direction of the strip material.

The strip material is winded from winding start axis to both ends of the strip material at a same time until all the dielectric distribution areas are winded into the strip material and each dielectric distribution area thus forms a corresponding artificially predetermined three-dimensional lens body inside a resulting winded body, wherein the winding process remains in the longitudinal direction of the strip material.

Each winding layer is fixed during or after the winding process.

The present invention also provides another method for producing an electromagnetic lens, which specifically includes the following steps.

A corresponding dielectric distribution area is arranged for each lens body on a strip material. For a dielectric distribution area belonging to a same lens body, in a longitudinal direction of the strip material, a dielectric material is distributed in a way that a dielectric constant changes monotonically, and in a transverse direction of the strip material, the dielectric material is distributed in a way that a dielectric constant is higher in the middle and monotonically decreases to two sides. An end of the strip material having a higher dielectric constant is also a solid end of the strip material. There are S strip materials of the same specification manufactured in this step, where S is greater than or equal to 2.

Respective ends of these strip materials having a higher dielectric constant are combined in common contact, and then all the strip materials are winded at a same time with a central axis of their common contact structure being taken as a winding starting axis until all the dielectric distribution areas are winded into the strip materials and each dielectric distribution area thus forms a corresponding artificially predetermined three-dimensional lens body inside a resulting winded body, wherein the winding process remains in a longitudinal direction of each strip material.

Each winding layer is fixed during or after a winding process.

The present invention also provides another method for producing an electromagnetic lens, which specifically includes the following steps.

A corresponding dielectric distribution area is arranged for each lens body on a strip material. For a dielectric distribution area belonging to a same lens body, in a longitudinal direction of the strip material, a dielectric material is distributed in a way that a dielectric constant is higher in the middle and monotonically decreases to two sides, and in a transverse direction of the strip material, the dielectric material is distributed in a way that the dielectric constant is higher in the middle and monotonically decreases to two sides. Centers of the dielectric distribution areas belonging to different lens bodies on a same strip material all cross an axis called a winding starting axis, and the winding starting axis is vertical to the longitudinal direction of the strip material. A center of a dielectric distribution area refers to a position point having a highest dielectric constant in both the longitudinal direction and the transverse direction of the strip material. There are P strip materials of the same specification manufactured in this step, where P is greater than or equal to 2, or P is greater than or equal to 3.

The respective centers of the dielectric distribution areas of these strip materials are combined in common contact, then all the strip materials are winded at a same time with a central axis of their common contact structure being taken as a winding starting axis until all the dielectric distribution areas are winded into the strip materials and each dielectric distribution area thus forms a corresponding artificially predetermined three-dimensional lens body inside a resulting winded body, wherein the winding process remains in a longitudinal direction of each strip material.

Each winding layer is fixed during or after a winding process.

In the above methods for producing an electromagnetic lens, the form of layout of the dielectric distribution area may adopt the above triangular form or the rectangular form.

The present invention also provides a lens antenna, which includes an antenna oscillator and, in particular, the electromagnetic lens. A non-lens part is formed on the electromagnetic lens, and the antenna oscillator is fixed on the non-lens part.

Through such a technical solution, even a positioning structure between the antenna oscillator and the electromagnetic lens can be completely omitted. The positioning structure refers to a structure used for maintaining the relative position between the antenna oscillator and the lens body of the electromagnetic lens.

In the case that two or more lens bodies are arranged in the circumferential direction of the winded body, the antenna oscillator may be placed inside the winded body and at the non-lens part. In other cases, the antenna oscillator is usually at the periphery of the winded body.

The present invention has the following advantages.

1) good electromagnetic property; 2) high product consistency; 3) high production efficiency; 4) applicable to a wide range of target sizes; 5) being able to realize a compact and stable structure; and 6) being able to realize a single entity with multiple lenses.

DETAILED DESCRIPTION OF THE EMBODIMENTS

The content of the present invention is further explained below in combination with embodiments.

Embodiment 1

Figure 1:
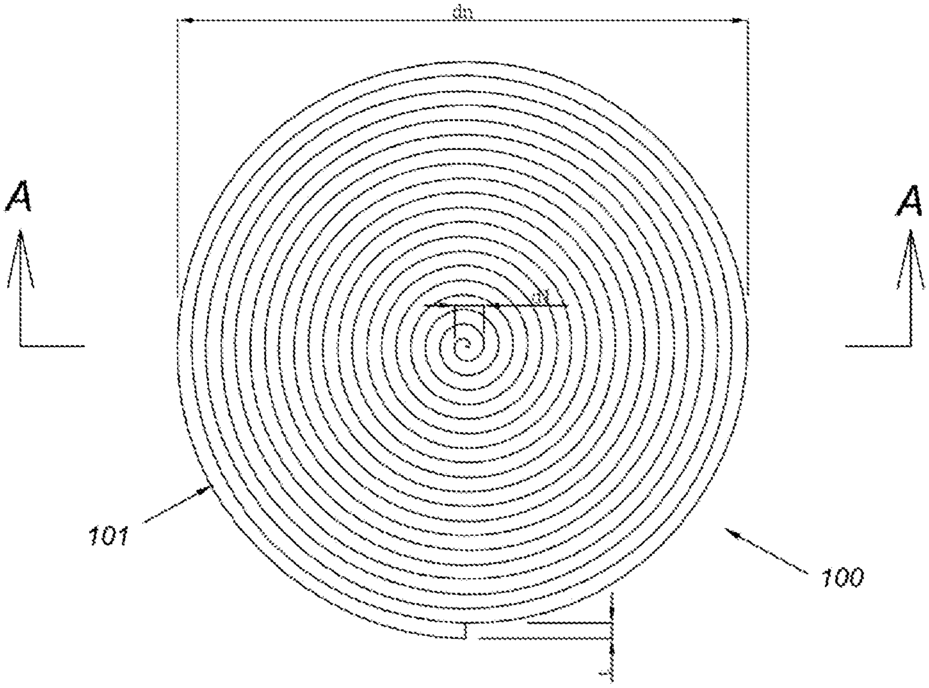
FIG. 1 is a schematic diagram of a top view structure of embodiment 1.
Figure 2:
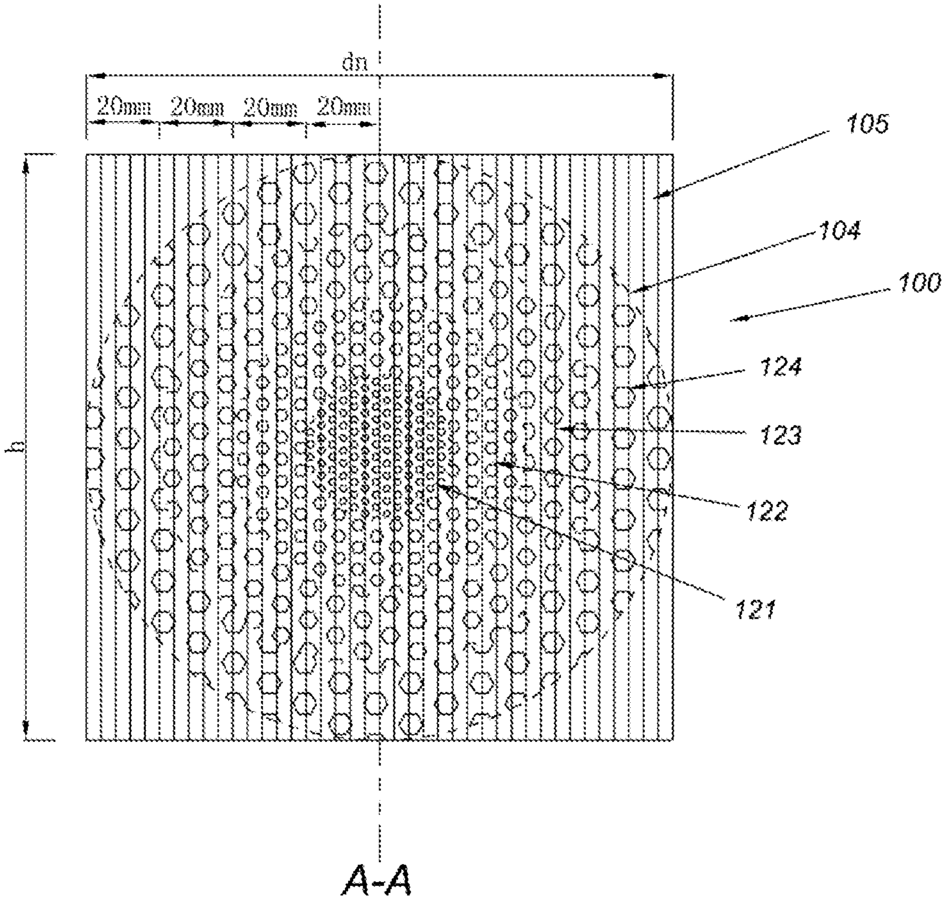
FIG. 2 is a schematic diagram of an A-A section structure of FIG. 1.
Figure 3:
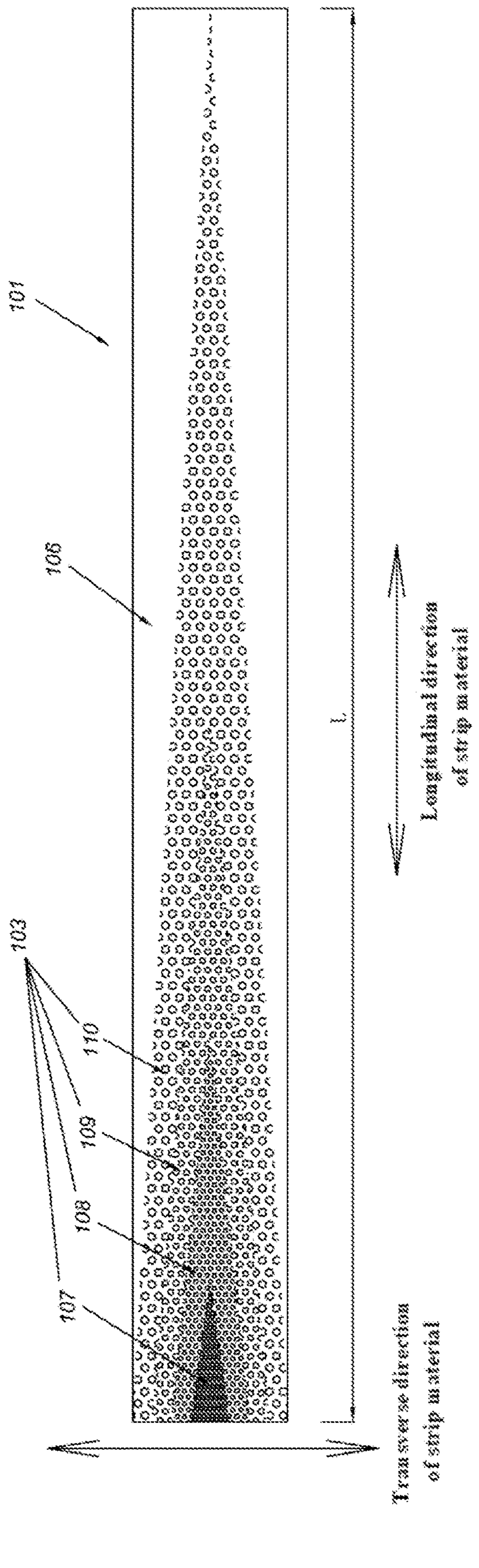
FIG. 3 is a schematic diagram of an unwinded structure of a strip material in embodiment 1.

This embodiment is an electromagnetic lens and a method for producing an electromagnetic lens. As shown in FIG. 1 and FIG. 2, the electromagnetic lens is a cylindrical winded body 100 formed by winding a strip material 101. As shown in FIG. 3, because there is a dielectric material distributed on a surface of the strip material 101, and the dielectric material is distributed in an area called a dielectric distribution area 103 which has a specific shape. After the strip material 101 is winded to be the winded body 100, the dielectric material will be distributed in an artificially predetermined spherical range inside the winded body 100. The spherical range where the dielectric material is distributed is a lens body 104 of the electromagnetic lens of this embodiment. A part of the winded body 100 besides the lens body 104 is called a non-lens part 105. The non-lens part 105 is formed of non-dielectric distribution areas 106 of the strip material 101.

In this embodiment, the strip material 101 is a foaming material with a low dielectric constant, and the closer the dielectric constant of the foaming material is to 1, the better. The specific types of materials are introduced in the Chinese patent document No. CN111262042B, and elaborations are omitted herein.

This embodiment aims to obtain a lens body that conforms to the classical model of the Luneberg lens and adopts a step approximation structure. Specifically, as shown in FIG. 2, the winded body 100 of this embodiment is formed by winding one strip material 101 from its one end. As shown in FIG. 3, the dielectric distribution area of the strip material 101 of this embodiment adopts a layout of a triangular form which includes one triangular area and three V-shaped areas. After the strip material 101 is winded to be the winded body 100, a strip material part where the dielectric distribution area 103 is located will form an approximately spherical lens body 104, and the formed lens body 104 will contain four dielectric constant step layers.

As shown in FIG. 3, the triangular form of the dielectric distribution area 103 includes one triangular area 107 and three V-shaped areas. These V-shaped areas are called a first V-shaped area 108, a second V-shaped area 109, and a third V-shaped area 110, respectively. The first V-shaped area 108 is smallest, the second V-shaped area 109 is larger, and the third V-shaped area 110 is largest. The first V-shaped area 108 half surrounds the triangular area 107, the second V-shaped area 109 half surrounds the first V-shaped area 108, and the third V-shaped area 110 half surrounds the second V-shaped area 109. Because the three V-shaped areas all have the same direction and are arranged in the longitudinal direction of the strip material 101, the triangular area and these V-shaped areas together form a whole dielectric distribution area 103 without blank inside. Because the outer contour of such a dielectric distribution area 103 is triangular, the name of the triangular form is obtained. The strip material part in the triangular area 107 has the highest dielectric constant, the strip material parts in the first V-shaped area 108 and the second V-shaped area 109 have dielectric constants getting lower successively, and the strip material part in the third V-shaped area 110 has the lowest dielectric constant. It can be seen that, in this embodiment, in the longitudinal direction of the strip material, the dielectric material is distributed in a way that the dielectric constant changes monotonically, and in the transverse direction of the strip material, the dielectric material is distributed in a way that the dielectric constant is higher in the middle and monotonically decreases to two sides. The triangular area 107 is directly close to one end of the strip material 101, and the strip material 101 is winded from a end of the strip material 101 where the triangular area 107 is located in the longitudinal direction of the strip material until the whole dielectric distribution area 103 is winded into the strip material. After that, a lens body having four dielectric constant step layers will be formed, and the central axis of the lens body 104 coincides with the central axis of the winded body 100. Specifically, the strip material part of the triangular area 107 is correspondingly formed with an innermost first dielectric constant step layer 121, the strip material part of the first V-shaped area 108 is correspondingly formed with a relatively outer second dielectric constant step layer 122, the strip material part of the second V-shaped area 109 is correspondingly formed with an outer third dielectric constant step layer 123, and the strip material part of the third V-shaped area 110 is correspondingly formed with an outermost fourth dielectric constant step layer 124. Since the planar triangular area 107 is in a form of an approximate sphere after winded, and the planar V-shaped area is in a form of an approximate hollow spherical shell after winded, the triangular area 107 will form the first dielectric constant step layer 121 in the shape of a sphere, the first V-shaped area 108, the second V-shaped area 109 and the third V-shaped area 110 will correspondingly form the second dielectric constant step layer 122, the third dielectric constant step layer 123 and the fourth dielectric constant step layer 124. Such a three-dimensional layered structure in which the dielectric constant decreases gradually from inside to outside is the structure required by the lens body of this embodiment.

As shown in FIG. 1 and FIG. 2, a target specification of this embodiment is that: the winded body 100 has a diameter dn of about 160 mm, and the lens body 104 has a diameter identical to the diameter of the winded body 100. The lens body 104 has four dielectric constant step layers, wherein each dielectric constant step layer has a thickness of about 20 mm. However, the strip material used in this embodiment has a width h of 160 mm and a thickness t of 2 mm. Accordingly, the dielectric constant step layers from inside to the outside respectively have an outside diameter of 40 mm, 80 mm, 120 mm, and 160 mm. Under this condition, it is necessary to determine key contour points of each triangular area and each V-shaped area to obtain their specific boundaries. A description is given below.

The total length L of the required strip material can be obtained by using the following approximate calculation formula: $L=\pi*n*(d1+dn)/2$, where dl is a value of the diameter of the innermost layer, dn is a value of the diameter of the outermost layer, n is the number of winding layers (single side); n is equal to $[(dn-d1)/(2*t)]+1$, where t is the thickness of a strip material with a constant thickness.

Specifically, in this embodiment, dn=160 mm, d1=4 mm, t=2 mm, and then $n=[(160-4)/(2\cdot 2)]+1=40$, and $L=\pi*40*(4+160)/2\approx 10299$ mm.

The above formula for calculating the total length of the strip material 101 may also be used to calculate the length of the triangular area and each V-shaped area in the longitudinal direction of the strip material, so as to determine their respective specific positions on the strip material.

Figure 4:
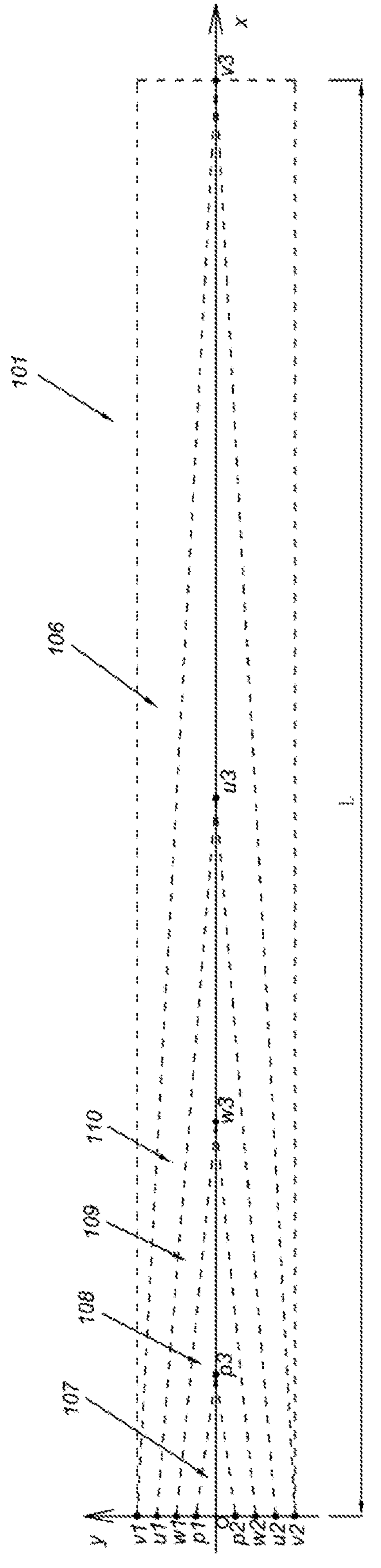
FIG. 4 shows the position of contour point of each area of a strip material in the coordinate system of embodiment 1.

As shown in FIG. 4, x coordinate is assumed to be a longitudinal direction of the strip material 101, y coordinate is assumed to be a transverse direction of the strip material 101, and a transverse midpoint of one end of the strip material 101 is assumed to be an origin O.

For the triangular area 107, the coordinates of its three contour points are p1 (0, 20), p2 (0, −20) and p3 (691, 0) respectively. The calculation result 691 is obtained as follows: since the outside diameter of the dielectric constant step layer corresponding to this area is 40 mm, $n=[(40-4)/(2\cdot 2)]+1=10$ and $L1=\pi*10*(4+40)/2\approx 691$.

For the first V-shaped area 108, the coordinates of its three contour points are w1 (0, 40), w2 (0, −40) and w3 (2638, 0) respectively. The result 2638 is calculated as follow: since the outside diameter of the dielectric constant step layer corresponding to this area is 80 mm, $n=[(80-4)/(2\cdot 2)]+1=20$ and $L2=\pi*20*(4+80)/2\approx 2638$.

For the second V-shaped area 109, the coordinates of its three contour points are u1 (0, 60), u2 (0, −60) and u3 (5840, 0) respectively. The result 5840 is calculated as follows: since the outside diameter of the dielectric constant step layer corresponding to this area is 120 mm, $n=[(120-4)/(2\cdot 2)]+1=30$ and $L3=\pi*30*(4+120)/2\approx 5840$.

For the third V-shaped area 110, the coordinates of its three contour points are v1 (0, 80), v2 (0, −80) and v3 (10299, 0) respectively. The result 10299 is calculated as follows: since the outside diameter of the dielectric constant step layer corresponding to this area is 160 mm, $n=[(160-4)/(2\cdot 2)]+1=40$ and $L4=L=\pi*40*(4+160)/2\approx 10299$.

After the coordinates of key contour points of each area have been calculated, the specific boundary of each area can be obtained. It is to be noted that the length L of the strip material may be greater than the longitudinal length of the dielectric distribution area in s triangular form. In this case, the non-lens part of the formed winded body will completely wrap the lens body.

Figure 5:
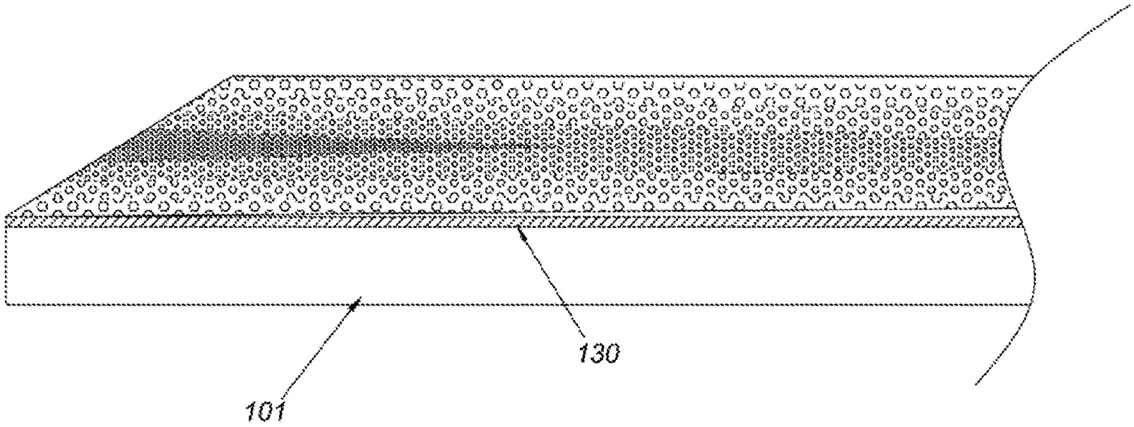
FIG. 5 is a schematic diagram of a structure of a strip material attached with a film of embodiment 1.
Figure 6:
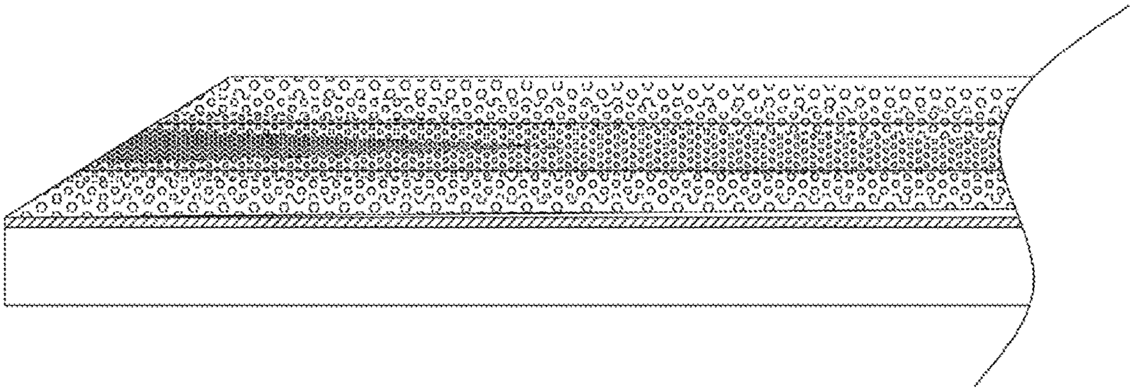
FIG. 6 is a schematic diagram of another structure of the strip material attached with a film.

As shown in FIG. 5, in this embodiment, the dielectric material is attached to a low dielectric constant film 130, and then the film is adhered to a surface of the strip material 101. The film 130 has a dielectric constant close to 1, while the dielectric material is a kind of ink having a high dielectric constant, such as conductive ink. The ink is printed on the film by a printer, and ink droplets form a pattern on the film. Since the sizes and positions of the ink droplets can be precisely controlled, the dielectric constant of the corresponding area can also be precisely controlled. Of course, the dielectric material may also be an entity having other form or structure. As shown in FIG. 6, when the width of the strip material is greater than the maximum printing width of a printer, the required patterns on the film may be printed one by one, and then these films are adhered onto the surface of the strip material in the longitudinal direction of the strip material, and spliced into a target pattern. FIG. 6 shows that three films are adhered onto the surface of the strip material side by side in the longitudinal direction of the strip material.

The corresponding dielectric constants of the first dielectric constant step layer 121, the second dielectric constant step layer 122, the third dielectric constant step layer 123, the fourth dielectric constant step layer 124 and the non-lens part 105 set in this embodiment are respectively 2, 1.7, 1.4, 1.1, and 1. This distribution law is based on a step approximation law of the classical model of the Luneberg lens. If it is desired to achieve a more ideal effect, more number of dielectric constant step layers may be set, but the number of dielectric constant step layers shall not be greater than the number of winding layers n. For example, in the case that the outside diameter of the winded body is set to be 160 mm and the thickness of the strip material is set to be 2 mm, the number of winding layers n is at most 160/(2*2), namely 40. Even if each winding layer is taken as one dielectric constant step layer, the number of dielectric constant step layers is at most 40. The number of winding layers can be increased by using thinner strip materials.

Embodiment 2

Figure 7:
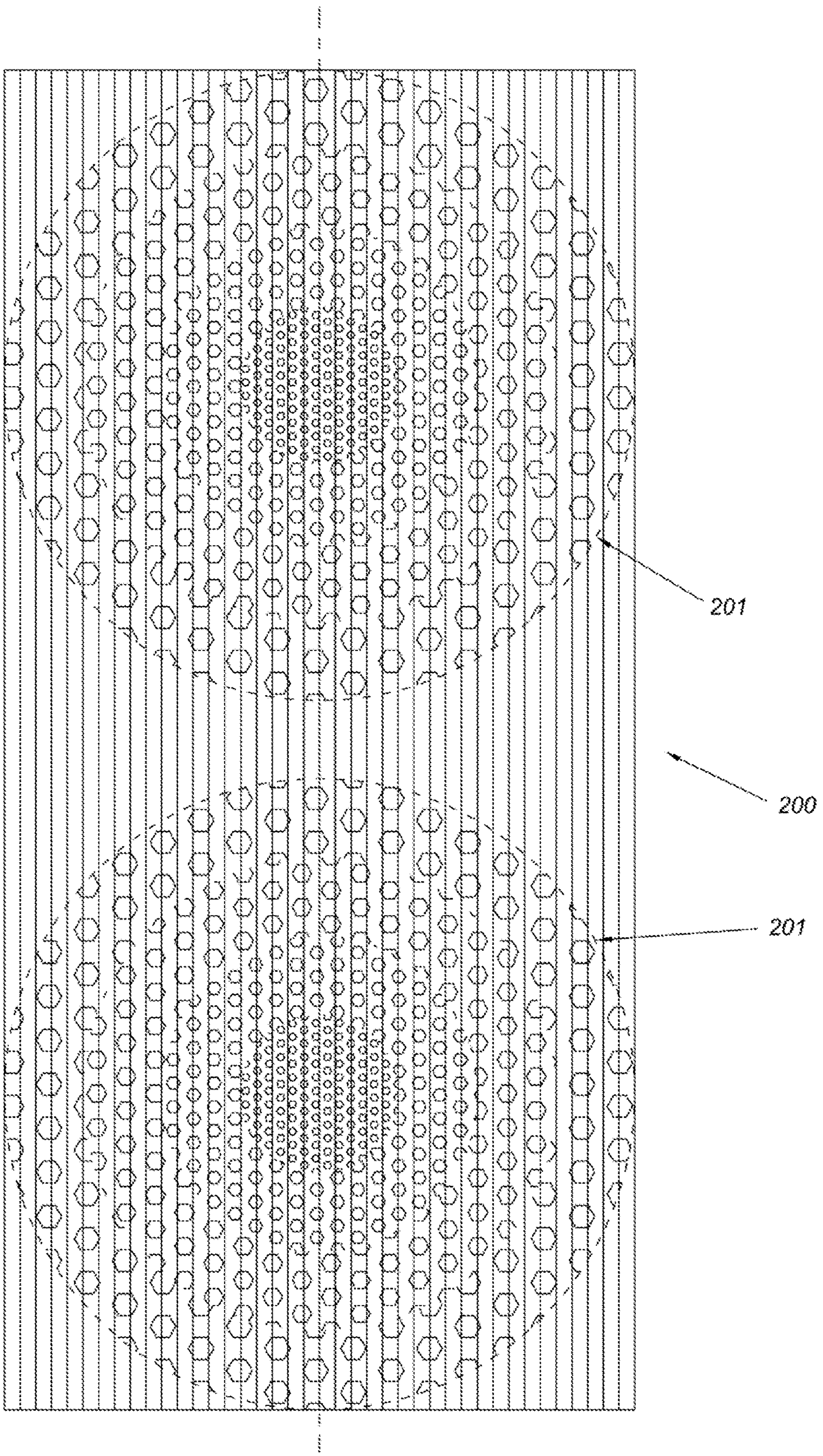
FIG. 7 is a schematic diagram of a cross-sectional structure of embodiment 2.

As shown in FIG. 7, this embodiment is an electromagnetic lens. A winded body 200 adopts a same winding manner and structure as embodiment 1, but there are two spherical lens bodies 201 of a same size formed within the winded body 200. The two lens bodies 201 are respectively provided at two ends of the cylinder. In each of the two lens bodies 201, the dielectric constant gets lower and lower in all directions from inside to outside of lens body. The two lens bodies 201 are arranged along the central axis of the winded body 200.

Embodiment 3

Figure 8:
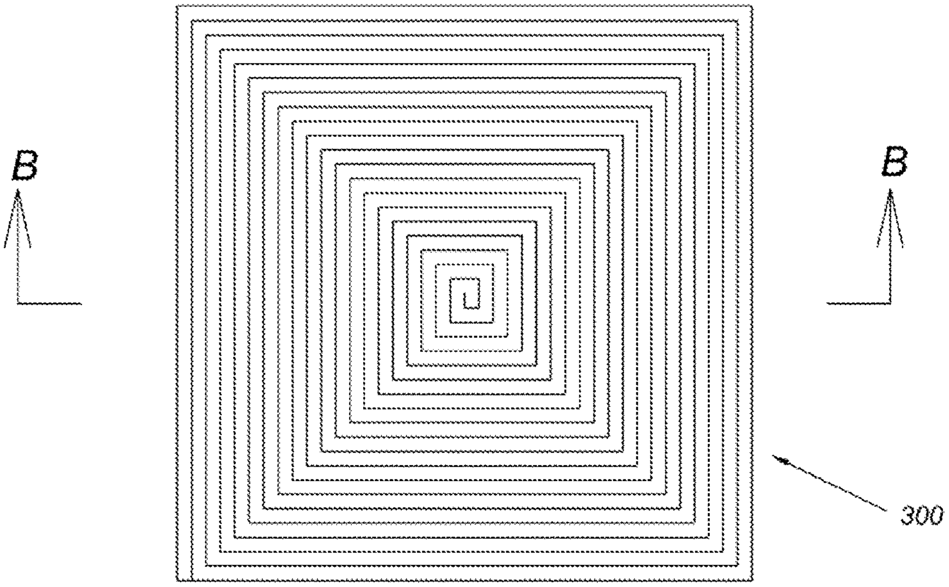
FIG. 8 is a schematic diagram of a top view structure of embodiment 3.
Figure 9:
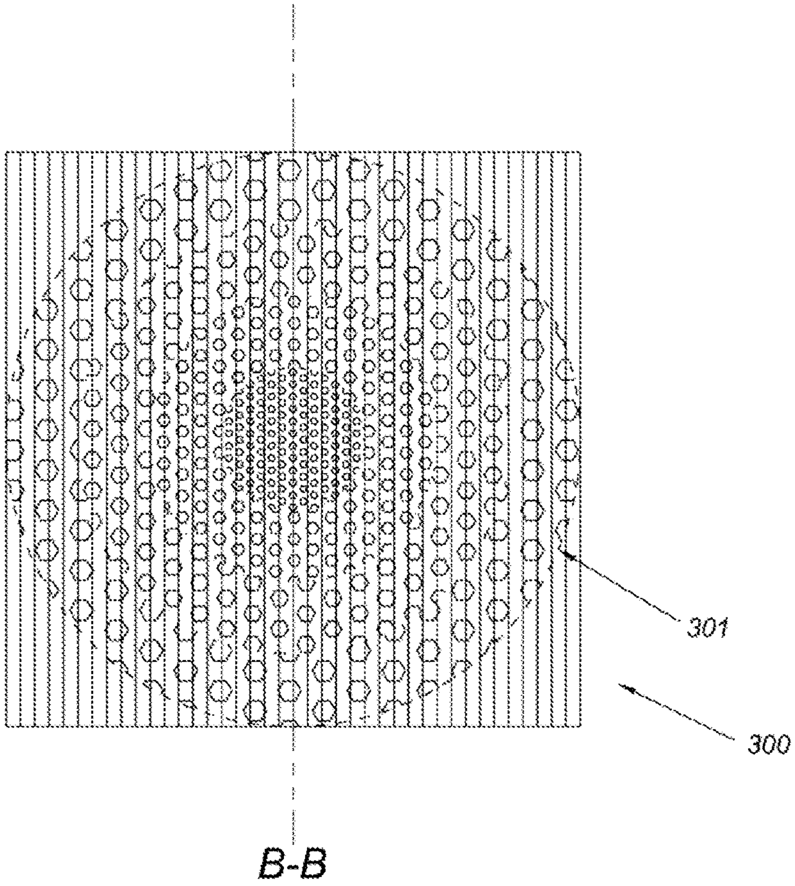
FIG. 9 is a schematic diagram of a B-B section structure of FIG. 8.

As shown in FIG. 8 and FIG. 9, this embodiment is an electromagnetic lens. A winded body 300 is in a form of a pyramid, and there is one spherical lens body 301 formed within the winded body 300. In the lens body 301, the dielectric constant gets lower and lower in all directions from inside to outside of the lens body, and the central axis of the lens body 301 coincides with that of the winded body 300.

Embodiment 4

Figure 10:
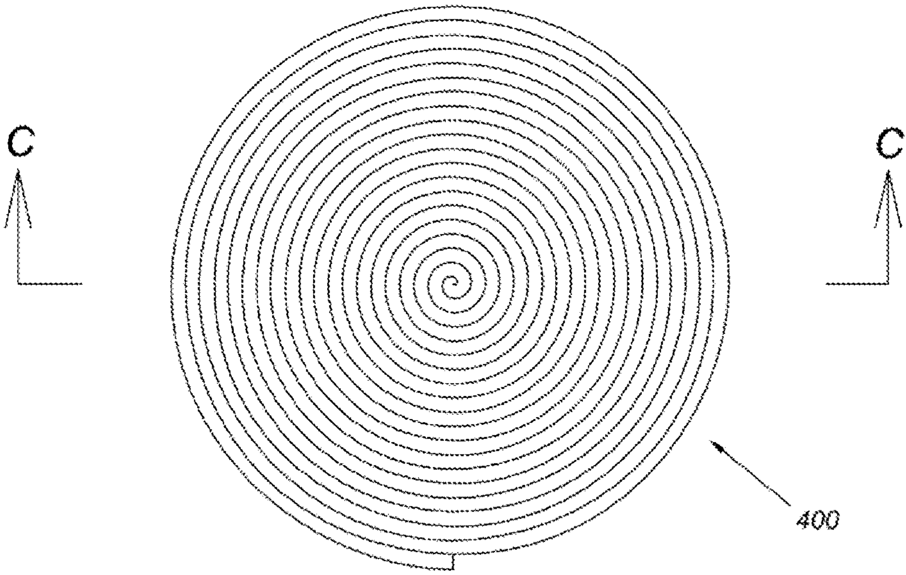
FIG. 10 is a schematic diagram of a top view structure of embodiment 4.
Figure 11:
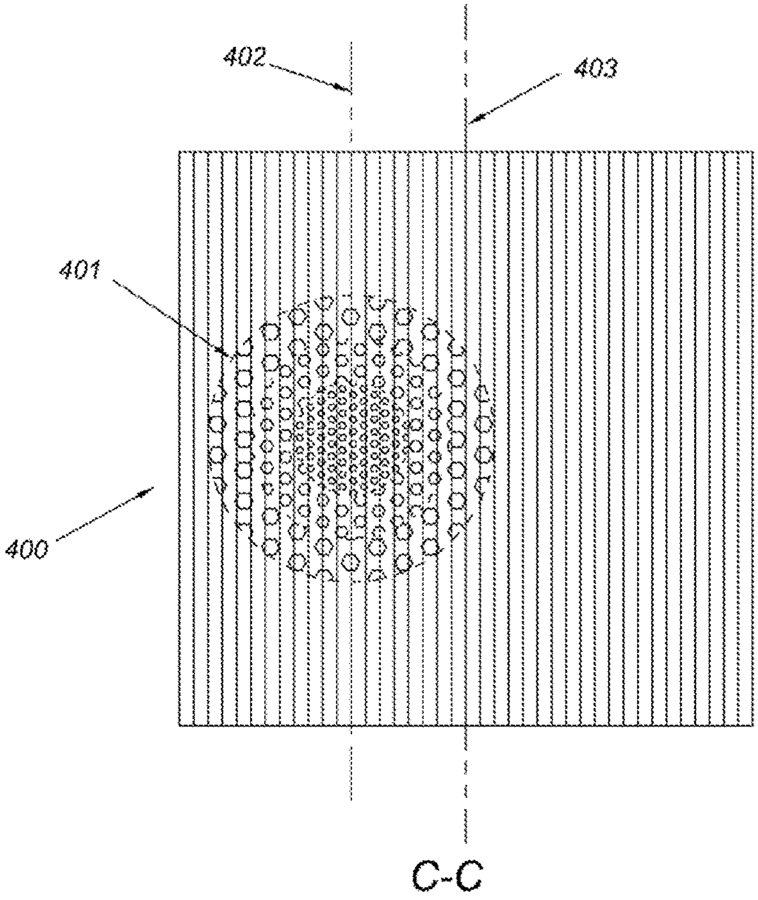
FIG. 11 is a schematic diagram of a C-C section structure of FIG. 10.

As shown in FIG. 10 and FIG. 11, this embodiment is an electromagnetic lens. A winded body 400 is in a form of a cylinder, and there is one spherical lens body 401 formed within the winded body 400. In the lens body 401, the dielectric constant gets lower and lower in all directions from inside to outside of the lens body, and the central axis 402 of the lens body 401 is parallel to and does not coincide with the central axis 403 of the winded body 400.

The method for producing the electromagnetic lens of this embodiment is different from the method of embodiment 1, which will be described by the inventor in other documents.

Embodiment 5

Figure 12:
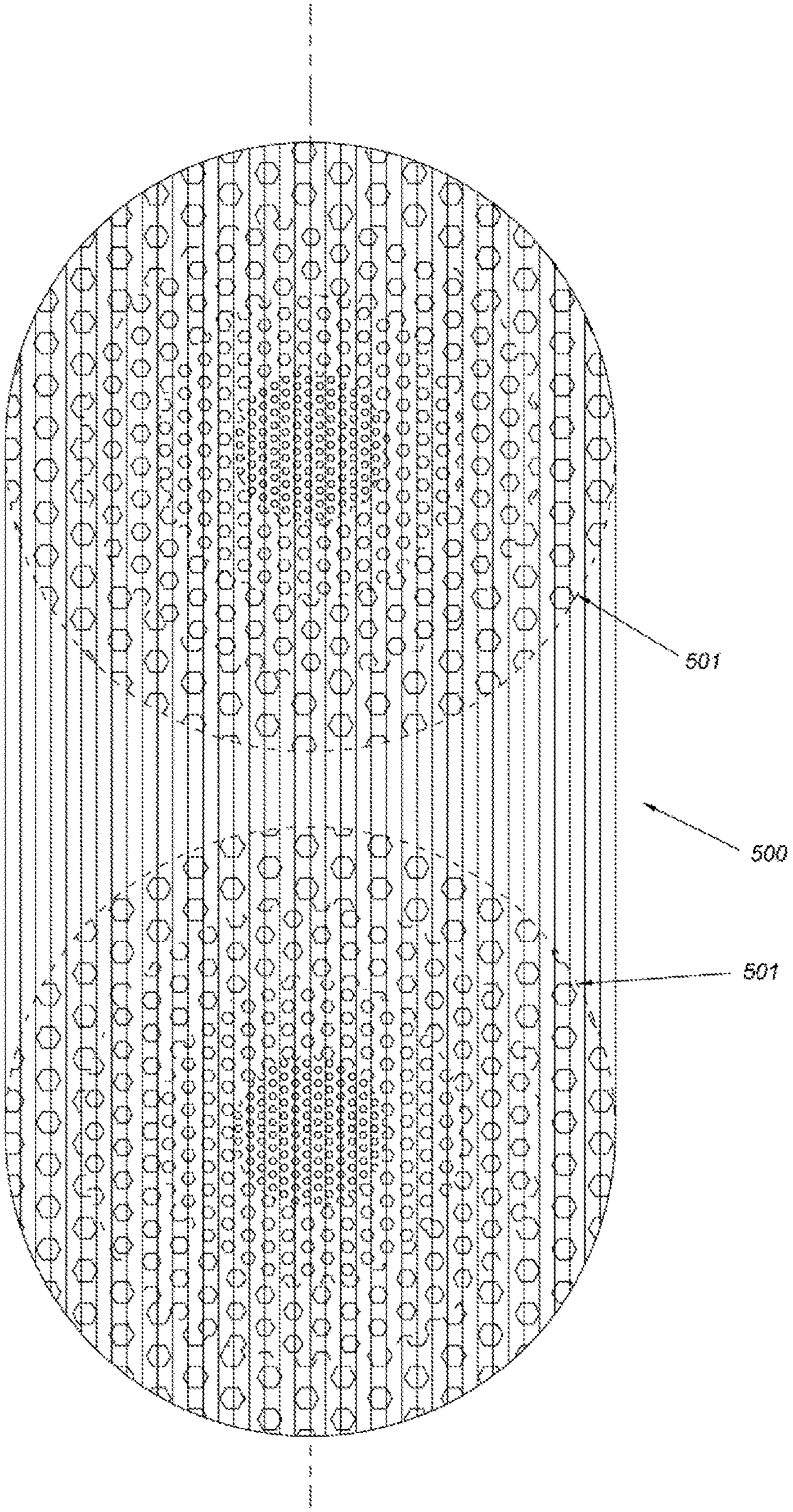
FIG. 12 is a schematic diagram of a cross-sectional structure of embodiment 5.

As shown in FIG. 12, this embodiment is an electromagnetic lens. A winded body 500 adopts the winding way as embodiment 1. The winded body 500 is in a form of a capsule-shaped cylinder. There are two spherical lens bodies 501 formed within the winded body 500, and the two lens bodies 501 are respectively at two ends of the capsule-shaped cylinder. In the lens body 501, the dielectric constant gets lower and lower in all directions from inside to outside of the lens body. The two lens bodies 501 are arranged along the central axis of the winded body 500.

Embodiment 6

Figure 13:
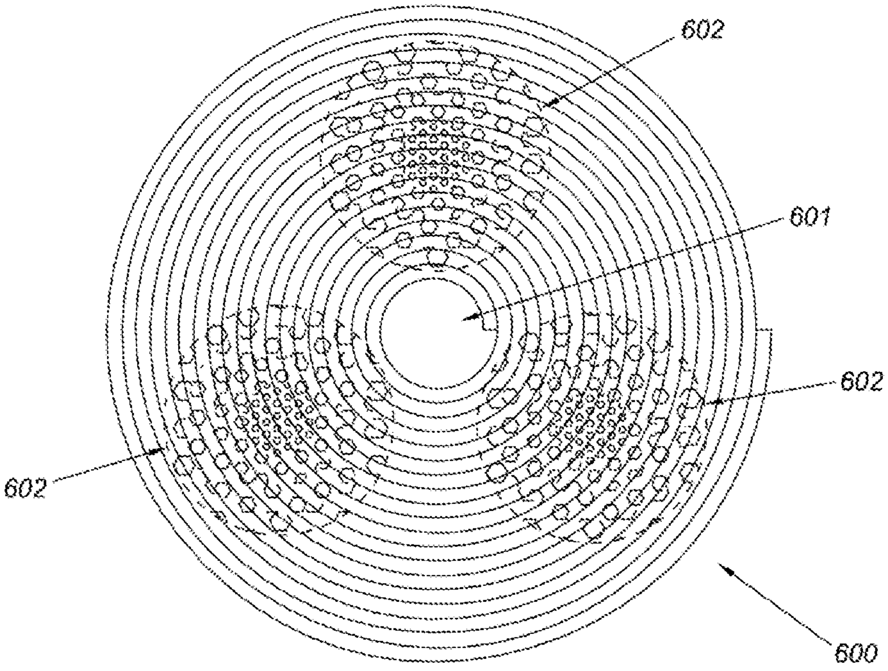
FIG. 13 is a schematic diagram of a top view structure of embodiment 6.
Figure 14:
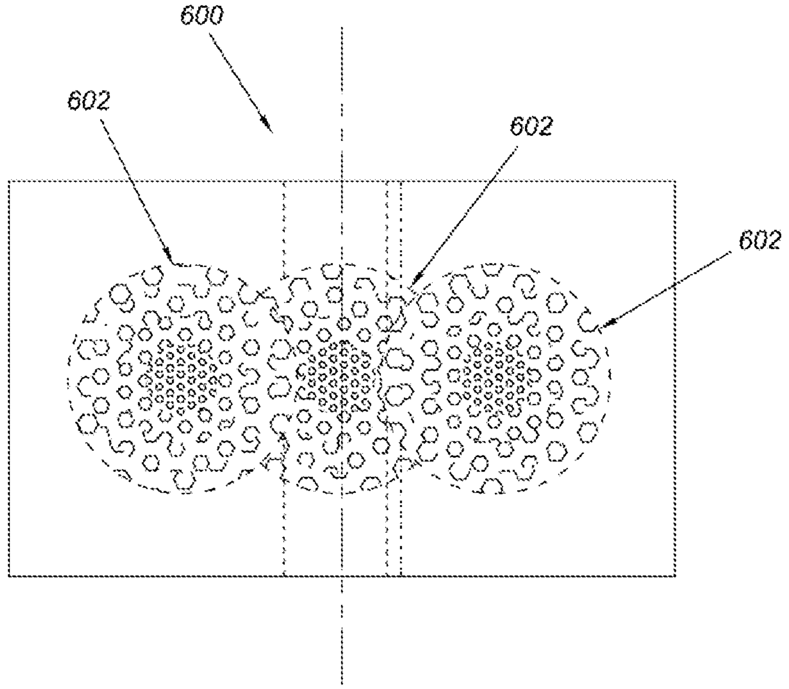
FIG. 14 is a schematic diagram of a front view structure of embodiment 6.

As shown in FIG. 13 and FIG. 14, this embodiment is an electromagnetic lens. A winded body 600 is in a form of a tube, which is equivalent to provide a through hole 601 in the cylinder body, and the axis of the through hole 601 coincides with or is parallel to the axis of the cylinder. Specifically, in this embodiment, the outer circumference of the tube is a cylindrical surface, and its internal through hole 601 is a circular hole. However, the tube has a relatively thicker winded wall formed by the winding, and there are three spherical lens bodies 602 formed inside the wall. In the lens body 602, the dielectric constant gets lower and lower in all directions from inside to outside of the lens body. The three lens bodies 602 of this embodiment are arranged in the circumferential direction of the winded body 600.

The method for producing the electromagnetic lens of this embodiment is different from the method of embodiment 1, which will be described by the inventor in other documents.

Embodiment 7

Figure 15:
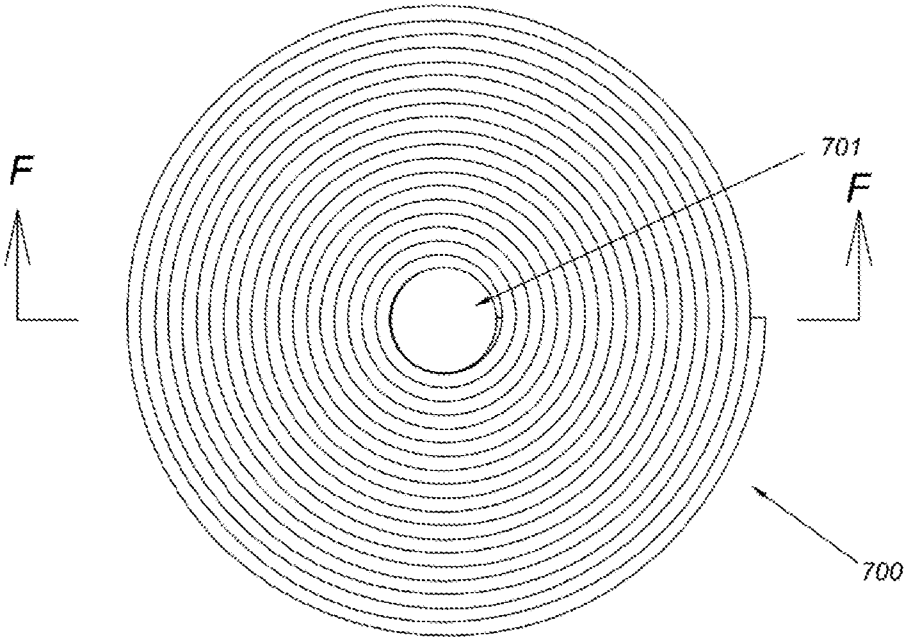
FIG. 15 is a schematic diagram of a top view structure of embodiment 7.
Figure 16:
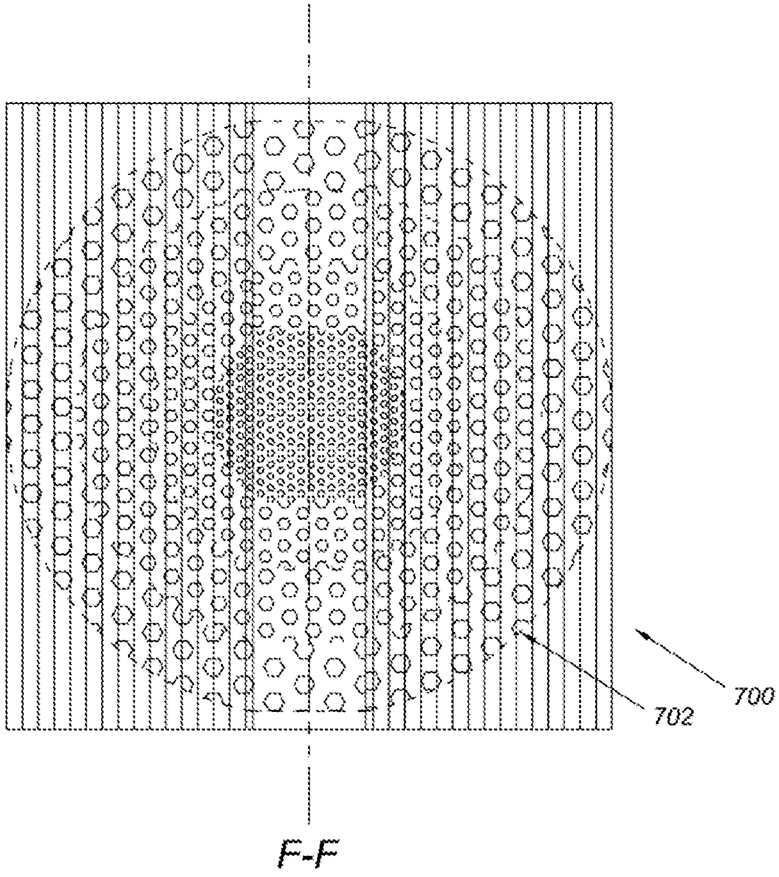
FIG. 16 is a schematic diagram of a F-F section structure of FIG. 15.
Figure 17:
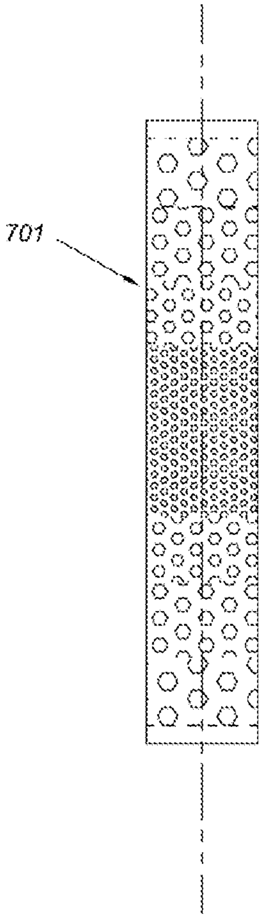
FIG. 17 is a schematic diagram of a cross-sectional structure of a rod-shaped part in embodiment 6.

As shown in FIG. 15 and FIG. 16, this embodiment is an electromagnetic lens. A winded body 700 is in a form of a cylinder. A larger winding radius is used for winding a strip material, so a tubular cavity is formed in a central part of the cross section of the winded body 700. After the whole winding process is completed, the tubular cavity is filled with a rod-shaped part 701. There is one lens body 702 formed in the winded body 700, and the central axis of the lens body 702 coincides with that of the winded body 700. Since the central axis of the tubular cavity coincides with the central axis of the winded body 700, the rod-shaped part 701 passes through the lens body 702 and their respective central axes also coincide. As shown in FIG. 17, a part of the rod-shaped part 701 passing through the lens body has a dielectric constant distribution matching the lens body. Accordingly, it can be ensured that, inside the lens body, the dielectric constant gets lower and lower in all directions from inside to outside of the lens body.

Figure 18:
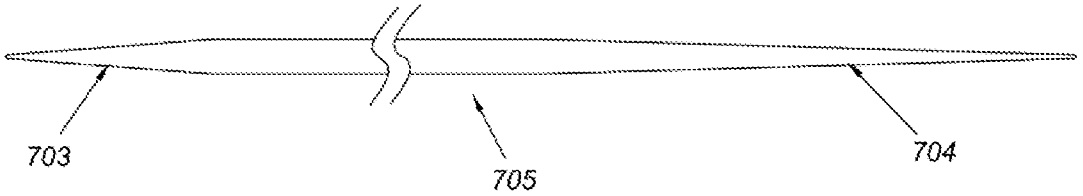
FIG. 18 is a schematic diagram of a structure of a strip material having an inconstant thickness.

As shown in FIG. 18, a strip material 705 having a winding starting part 703 and a winding finishing part 704 thinner than other parts may also be used for rolling.

Embodiment 8

Figure 19:
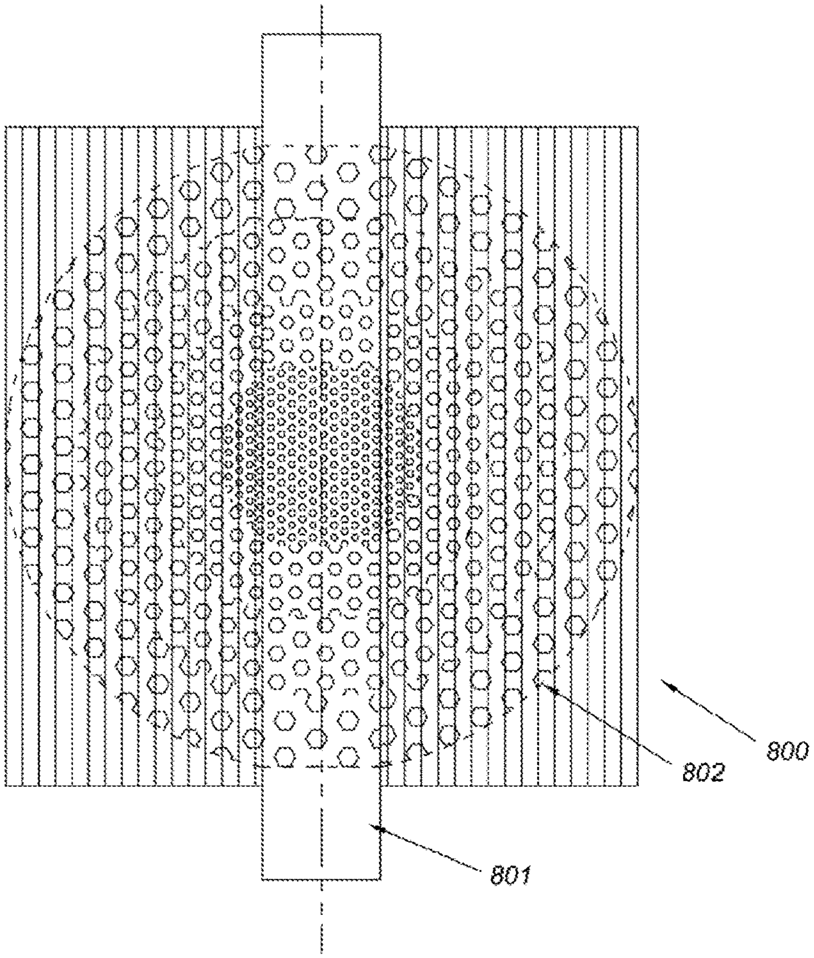
FIG. 19 is a schematic diagram of a cross-sectional structure of embodiment 8.

As shown in FIG. 19, the difference between this embodiment and embodiment 7 lie in that: the central part of the winded body 800 is provided with a shaft 801 for taking-up and winding the strip material. A part of the shaft 801 passing through the lens body 802 has a dielectric constant distribution matching the lens body 802. Accordingly, it can be ensured that, inside the lens body 802, the dielectric constant gets lower and lower in all directions from inside to outside of the lens body. Two ends of the shaft 801 are taken as fixed ends of the electromagnetic lens for mechanical connection with a lens holder (not shown).

Embodiment 9

Figure 20:
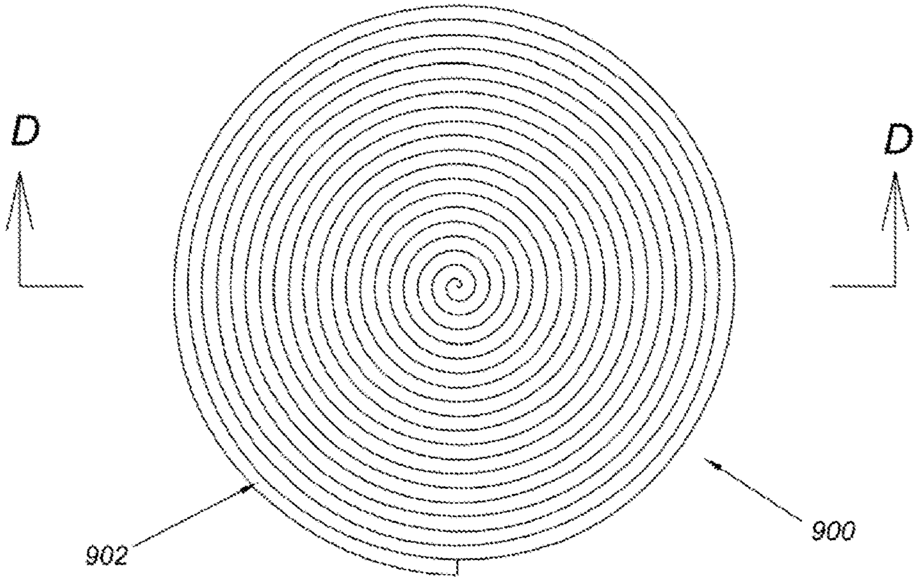
FIG. 20 is a schematic diagram of a top view structure of embodiment 9.
Figure 21:
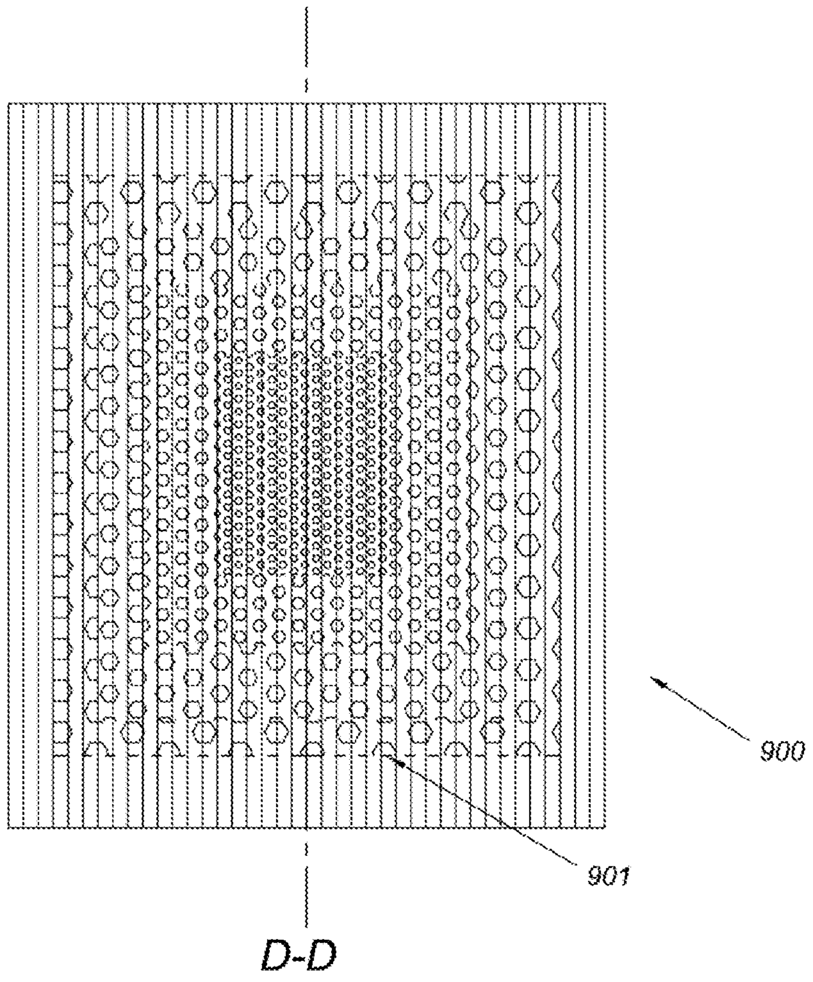
FIG. 21 is a schematic diagram of a D-D section structure of FIG. 20.
Figure 22:
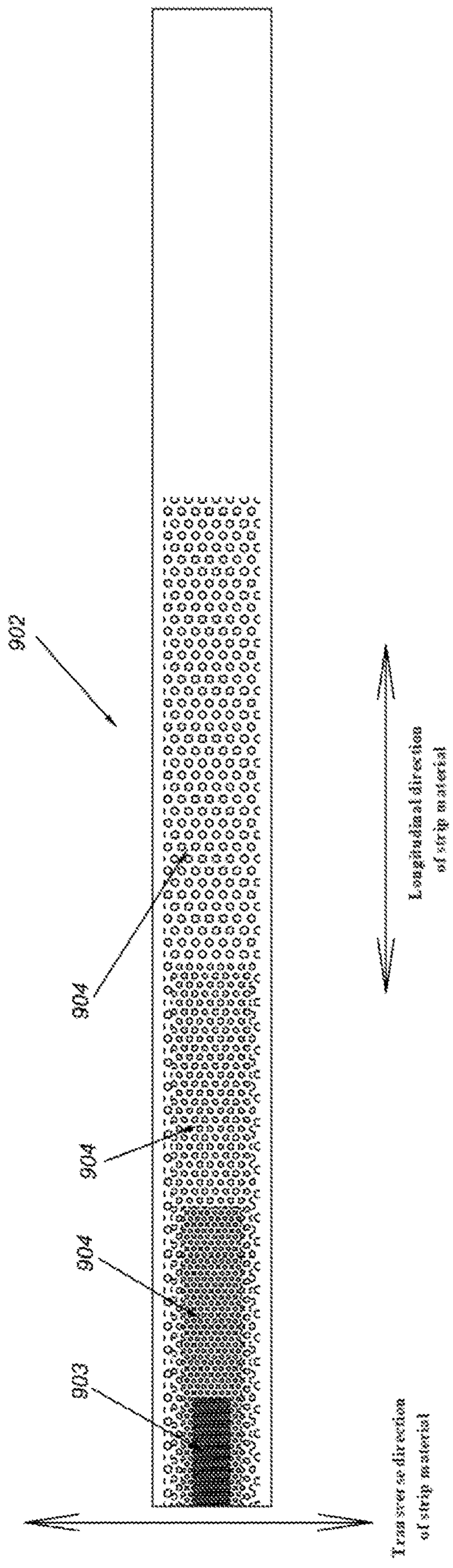
FIG. 22 is a schematic diagram of an unwinded structure of a strip material in embodiment 9.

As shown in FIG. 20 and FIG. 21, this embodiment is an electromagnetic lens. A winded body 900 is in a form of a cylinder, and there is one cylindrical lens body 901 formed within the winded body 900. The winded body 900 of this embodiment is winded from an end of a strip material having a higher dielectric constant, and the central axis of the lens body 901 coincides with the central axis of the winded body 900. The dielectric distribution area of a strip material 902 is in a rectangular form, as shown in FIG. 22. The length of a rectangular area 903 in the longitudinal direction of the strip material 902 may be calculated by referring to the calculation process of the triangular area in embodiment 1, and the length of each U-shaped area 904 in the longitudinal direction of the strip material 902 may be calculated by referring to the calculation process of the corresponding V-shaped area in embodiment 1. The lens bodies formed in a rectangular form have a same structure as those formed in aa triangular form, and the dielectric constant decreases gradually in all directions from inside to outside of these lens bodies. The difference lies in that the forms of the lens bodies formed by winding are different. The former is more often used to form a lens body in a form of a cylinder when the winded body is in a form of a cylinder, or to form a lens body in a form of a pyramid when the winded body is in a form of a pyramid.

Embodiment 10

Figure 23:
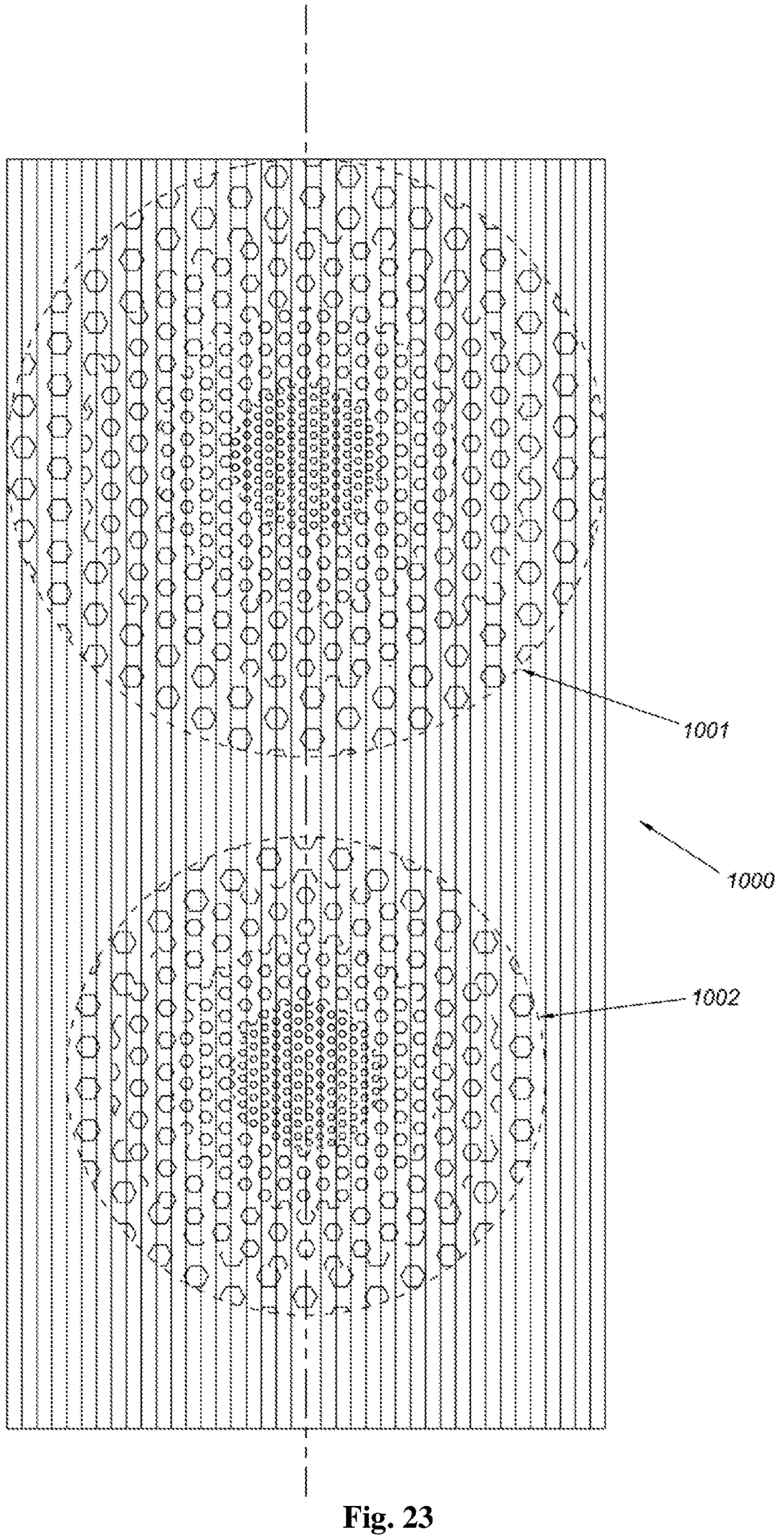
FIG. 23 is a schematic diagram of a cross-sectional structure of embodiment 10.

As shown in FIG. 23, the difference between this embodiment and embodiment 2 is that there is a large spherical lens body 1001 and a small spherical lens body 1002 formed inside the winded body 1000.

Embodiment 11

Figure 24:
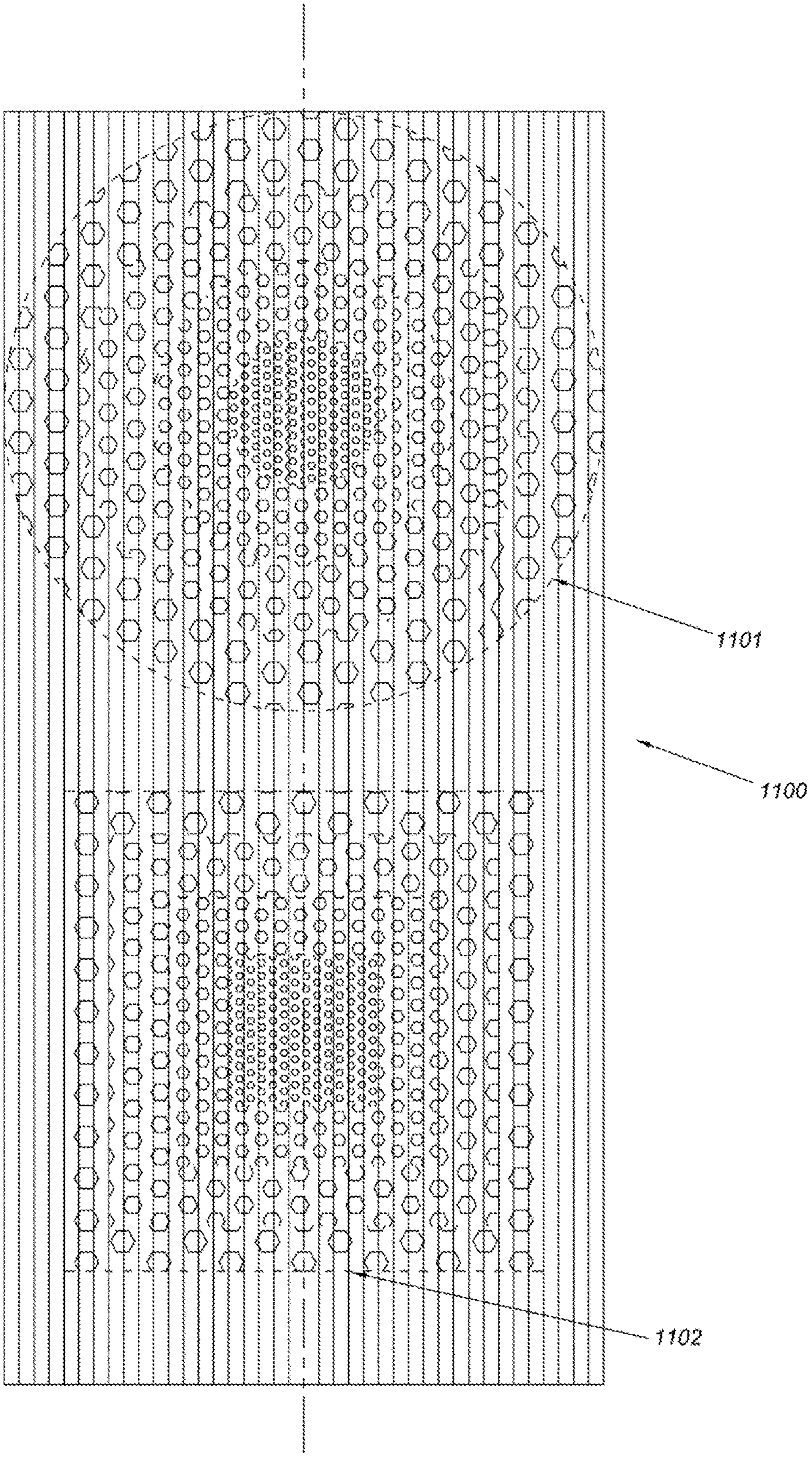
FIG. 24 is a schematic diagram of a cross-sectional structure of embodiment 11.

As shown in FIG. 24, the difference between this embodiment and embodiment 2 lies in there is a spherical lens body 1101 and a cylindrical lens body 1102 formed inside the winded body 1100.

Embodiment 12

Figure 25:
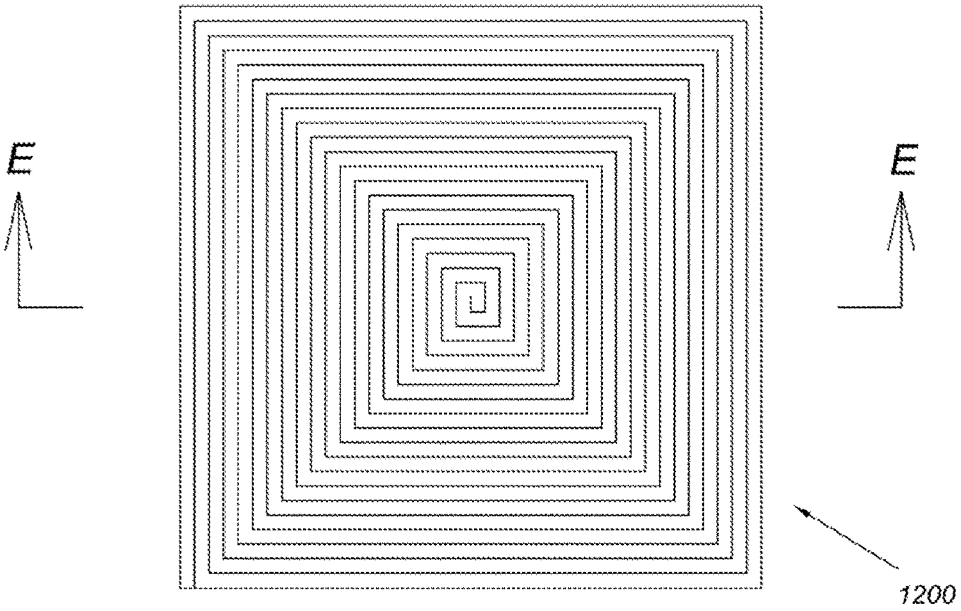
FIG. 25 is a schematic diagram of a top view structure of embodiment 12.
Figure 26:
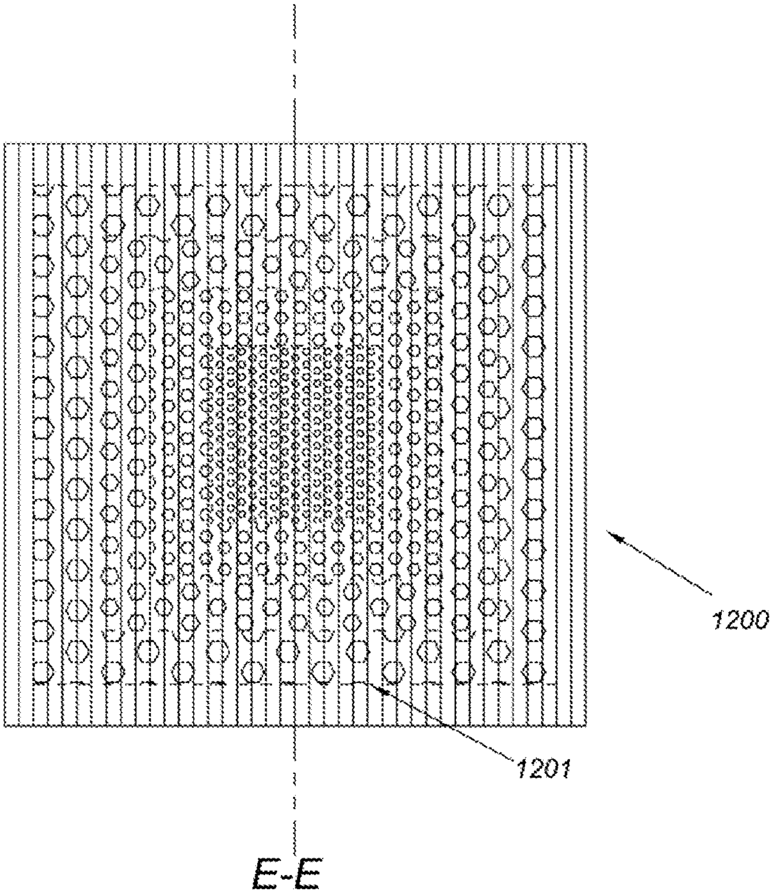
FIG. 26 is a schematic diagram of a E-E section structure of FIG. 25.

As shown in FIG. 25 and FIG. 26, the difference between this embodiment and embodiment 3 lies in that a lens body 1201 in the winded body 1200 is in a form of a pyramid.

Embodiment 13

Figure 27:
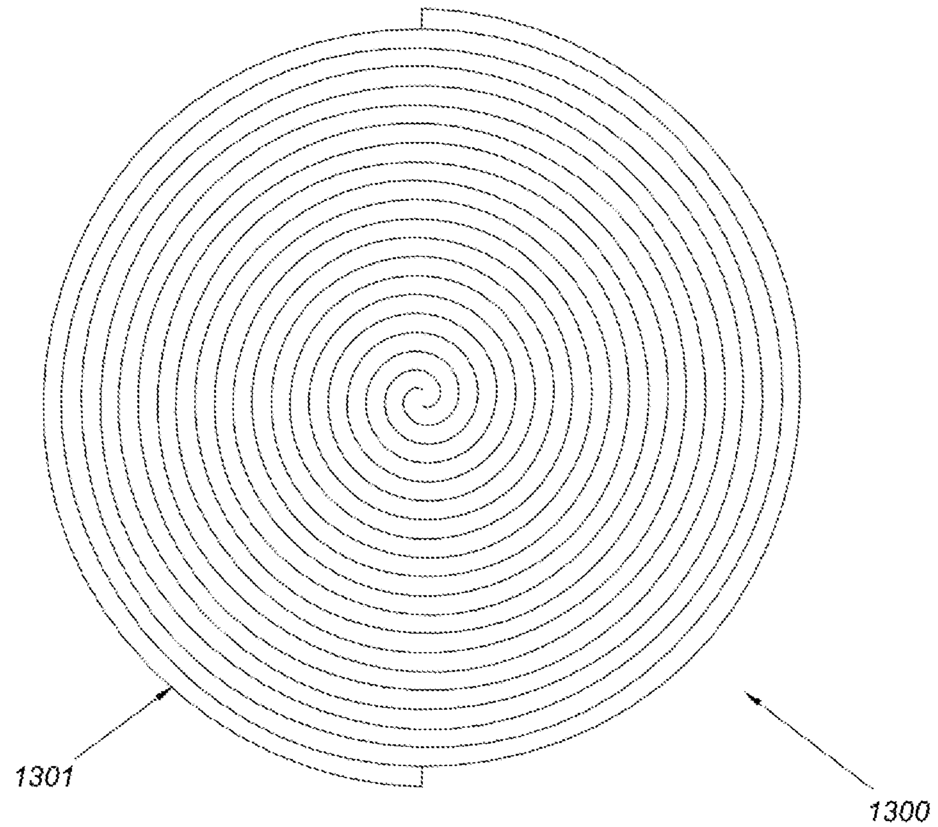
FIG. 27 is a schematic diagram of a top view structure of embodiment 13.
Figure 28:
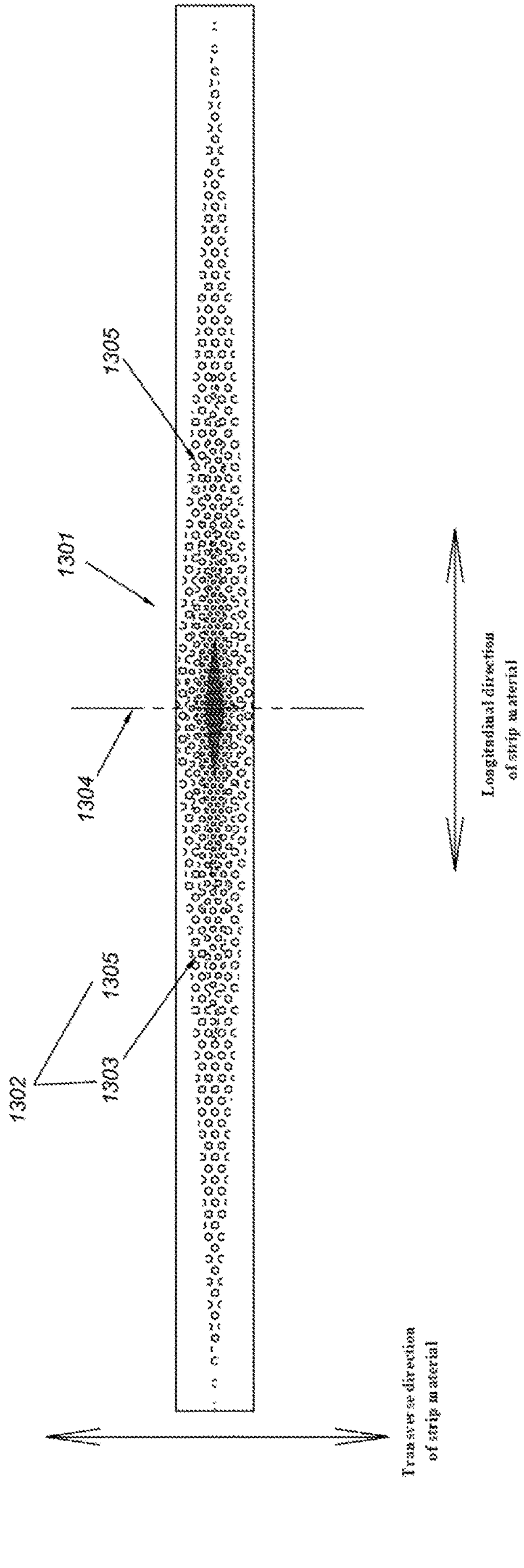
FIG. 28 is a schematic diagram of an unwinded structure of a strip material in embodiment 13.

As shown in FIG. 27, this embodiment is an electromagnetic lens and a method for producing an electromagnetic lens. A winded body 1300 is in a form of a cylinder and is formed by winding one piece of strip material from the middle of the strip material. Due to the winding starting position, a dielectric distribution area 1302 of a strip material 1301 in this embodiment is composed of two identical sub-dielectric distribution areas 1303 and 1305 in a triangular form, and the two sub-dielectric distribution areas 1303 and 1305 in a triangular form are close to each other, as shown in FIG. 28; this is equivalent to that, in the dielectric distribution areas, in the longitudinal direction of the strip material 1301, the dielectric material is distributed in a way that the dielectric constant is higher in the middle and monotonically decreases to two sides, and in the transverse direction of the strip material 1301, the dielectric material is distributed in a way that the dielectric constant is higher in the middle and monotonically decreases to two sides. In this embodiment, the centers of the dielectric distribution areas belonging to different lens bodies all pass through an axis called a winding starting axis 1304 and the winding starting axis 1304 is vertical to the longitudinal direction of the strip material 1301. A center of a dielectric distribution area 1302 refers to a position point having a highest dielectric constant in both the longitudinal direction and the transverse direction of the strip material 1301. Since winding a strip material from the middle of the strip material may be regarded as winding two short strip materials at a same time, in the case that the dielectric constant step layers having a same thickness, the winded length of such a strip material being winded is about only ½ that of a single strip material winded from one end. In this case, a longitudinal proportion of the dielectric distribution area on the strip material will also become about ½ of that on the single strip material, while a transverse proportion will remain unchanged. Under the same target of diameter of the winded body, the way of winding a strip material from the middle of the strip material can effectively shorten the rolling time required. The strip material 1301 is winded from the winding starting axis 1304 to two ends at a same time until all the dielectric distribution areas 1302 are winded into the strip material and each dielectric distribution area 1302 thus forms a corresponding spherical lens body inside the resulting winded body 1300, wherein the winding process remains in the longitudinal direction of the strip material 1301. In this case, the dielectric constant gets lower and lower in all directions from inside to outside.

Embodiment 14

Figure 29:
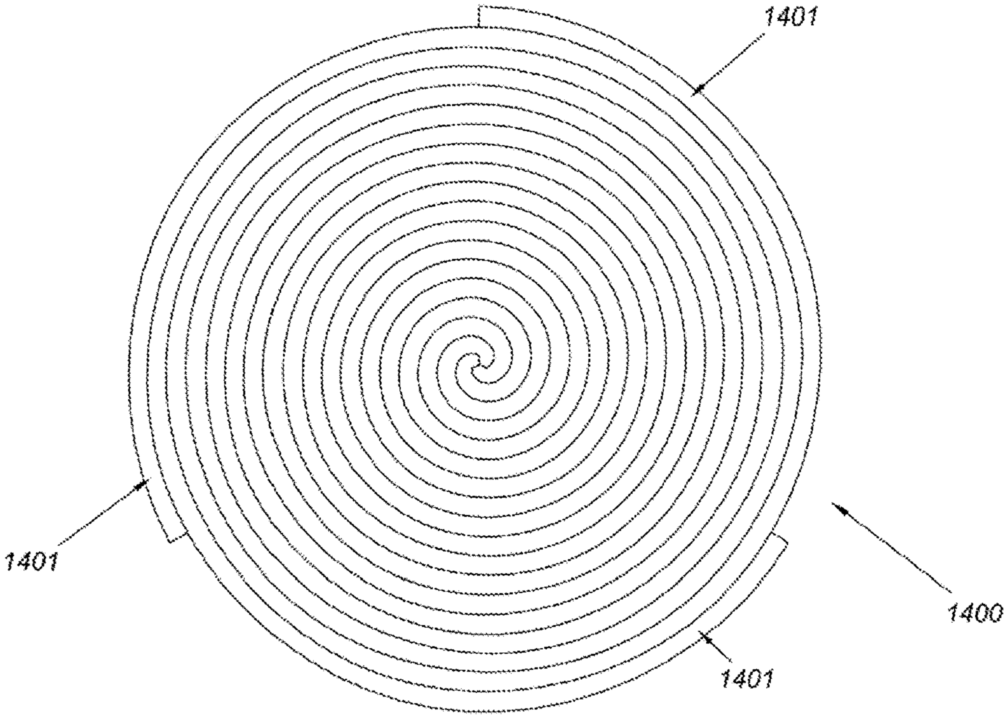
FIG. 29 is a schematic diagram of a top view structure of embodiment 14.

As shown in FIG. 29, this embodiment is an electromagnetic lens and a production method of an electromagnetic lens. A winded body 1400 is in a form of a cylinder and is formed by winding three pieces of strip materials 1401 at a same time. The respective ends of the three pieces of strip materials 1401 having a higher dielectric constant are combined in common contact, and then all the strip materials are winded at a same time with the central axis of their common contact structure being taken as a winding start axis. The respective dielectric distribution areas of the strip materials in this embodiment are in a triangular form, and the three strip materials 1401 are winded at a same time. In the case that the dielectric constant step layers having a same thickness, the winded length of each strip material 1401 is about only ⅓ of the length of a single strip material. In this case, a longitudinal proportion of the dielectric distribution area on each strip material 1401 will also become about ⅓ of that on the single strip material, while a transverse proportion will remain unchanged. Under the same target of diameter of the winded body, such a way for winding multiple strip materials at a same time can effectively shorten the winding time required. In this case, for the dielectric distribution area of a single strip material, in the longitudinal direction of the strip material, the dielectric material is distributed in a way that the dielectric constant changes monotonically, and in the transverse direction of the strip material, the dielectric material is distributed in a way that the dielectric constant is higher in the middle and monotonically decreases to two sides. After a strip material is winded to be a winded body, a spherical lens body is formed into the winded body, and inside the lens body, the dielectric constant gets lower and lower in all directions from inside to outside.

Embodiment 15

Figure 30:
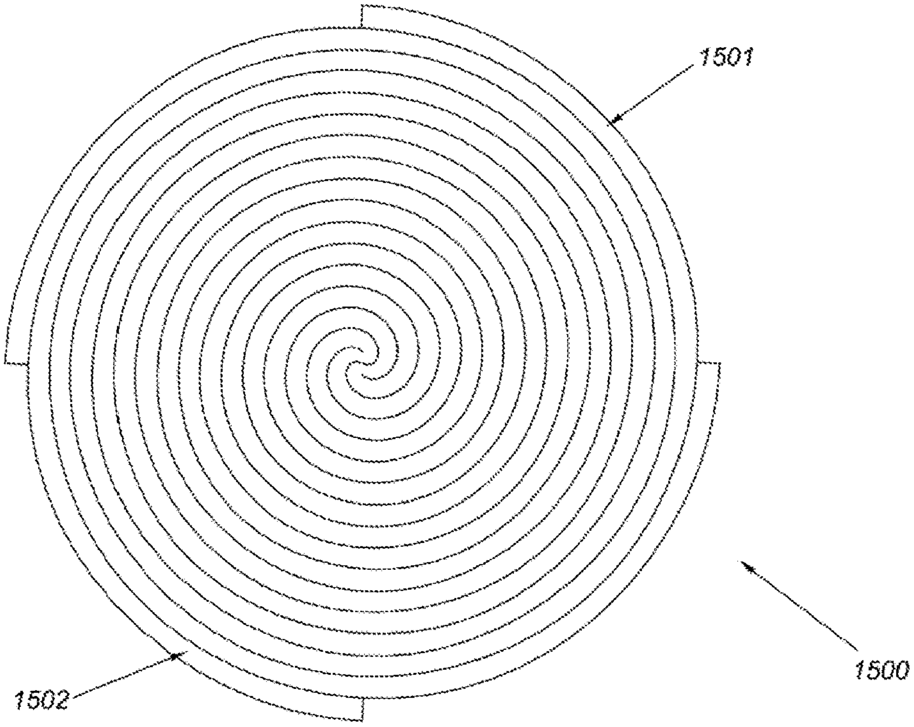
FIG. 30 is a schematic diagram of a top view structure of embodiment 15.

As shown in FIG. 30, this embodiment is an electromagnetic lens and a method for producing an electromagnetic lens. A winded body 1500 is in a form of a cylinder and is formed by winding two pieces of strip materials 1501 and 1502 having a same specification at a same time. Centers of the respective dielectric distribution areas of the two pieces of strip materials 1501 and 1502 are combined in common contact, and then all the strip materials are winded at a same time with the central axis of their common contact structure being taken as a winding starting axis. A center of a dielectric distribution area refers to a position point having a highest dielectric constant in both the longitudinal direction and the transverse direction of the strip material. Similar to embodiment 13, a dielectric distribution area of a single strip material in this embodiment is composed of two sub-dielectric distribution areas in a triangular form, and the two sub-dielectric distribution areas in a triangular form are close to each other; this is equivalent to that, in the dielectric distribution areas, the dielectric material is distributed, in the longitudinal direction of the strip material, in a way that the dielectric constant is higher in the middle and monotonically decreases to two sides, and in the transverse direction of the strip material, the dielectric material is distributed in a way that the dielectric constant is higher in the middle and monotonically decreases to two sides. However, since two strip materials 1501 and 1502 are winded from their respective middle at a same time, in the case that the dielectric constant step layers have a same thickness, the winded length of a single side of each strip material is about only ¼ of that of a single strip material.

In this case, a longitudinal proportion of the dielectric distribution area on each strip material will also become about ¼ of that on the single strip material, while a transverse proportion will remain unchanged. After the strip materials 1501 and 1502 are winded to be the winded body 1500, a spherical lens body is formed into the winded body, and inside the lens body, the dielectric constant gets lower and lower in all directions from inside to outside.

Embodiment 16

Figure 31:
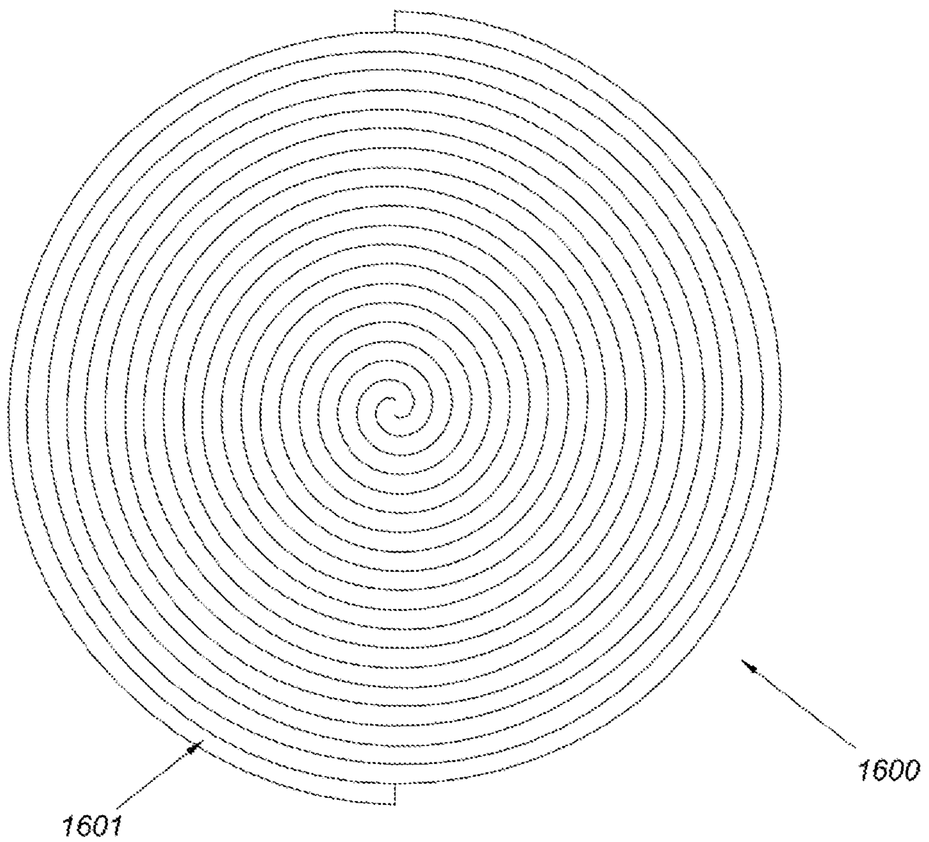
FIG. 31 is a schematic diagram of a top view structure of embodiment 16.
Figure 32:
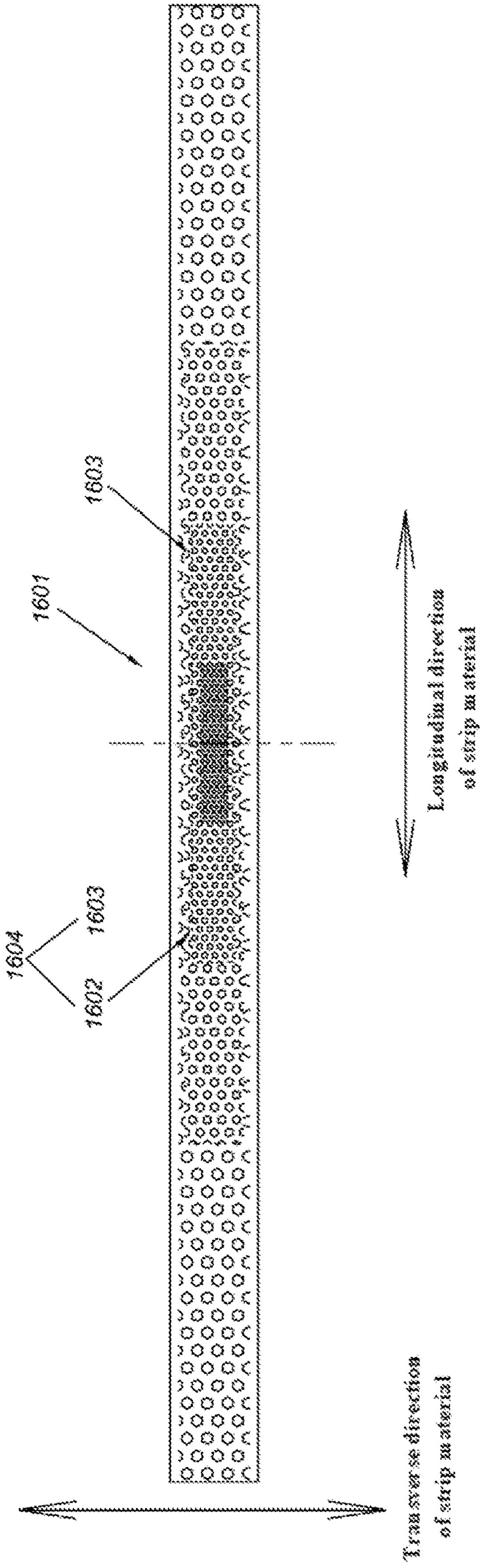
FIG. 32 is a schematic diagram of an unwinded structure of a strip material in embodiment 16.

As shown in FIG. 31, this embodiment is an electromagnetic lens. A winded body 1600 is in a form of a cylinder and is formed by winding one piece of strip material 1601 from the middle of the piece of strip material 1601. Due to the winding starting position, a dielectric distribution area 1604 of a strip material 1601 in this embodiment is composed of two identical sub-dielectric distribution areas 1602 and 1603 in a rectangular form, and the two sub-dielectric distribution areas 1602 and 1603 in a rectangular form are close to each other, as shown in FIG. 32. This is equivalent to that, in the dielectric distribution area 1604, in the longitudinal direction of the strip material 1601, the dielectric material is distributed in a way that the dielectric constant is higher in the middle and monotonically decreases to two sides, and in the transverse direction of the strip material 1601, the dielectric material is distributed in a way that the dielectric constant is higher in the middle and monotonically decreases to two sides. After the strip material 1601 is winded to be the winded body 1600, a cylindrical lens body is formed into the winded body 1600, and inside the lens body, the dielectric constant gets lower and lower in all directions from inside to outside.

Embodiment 17

Figure 33:
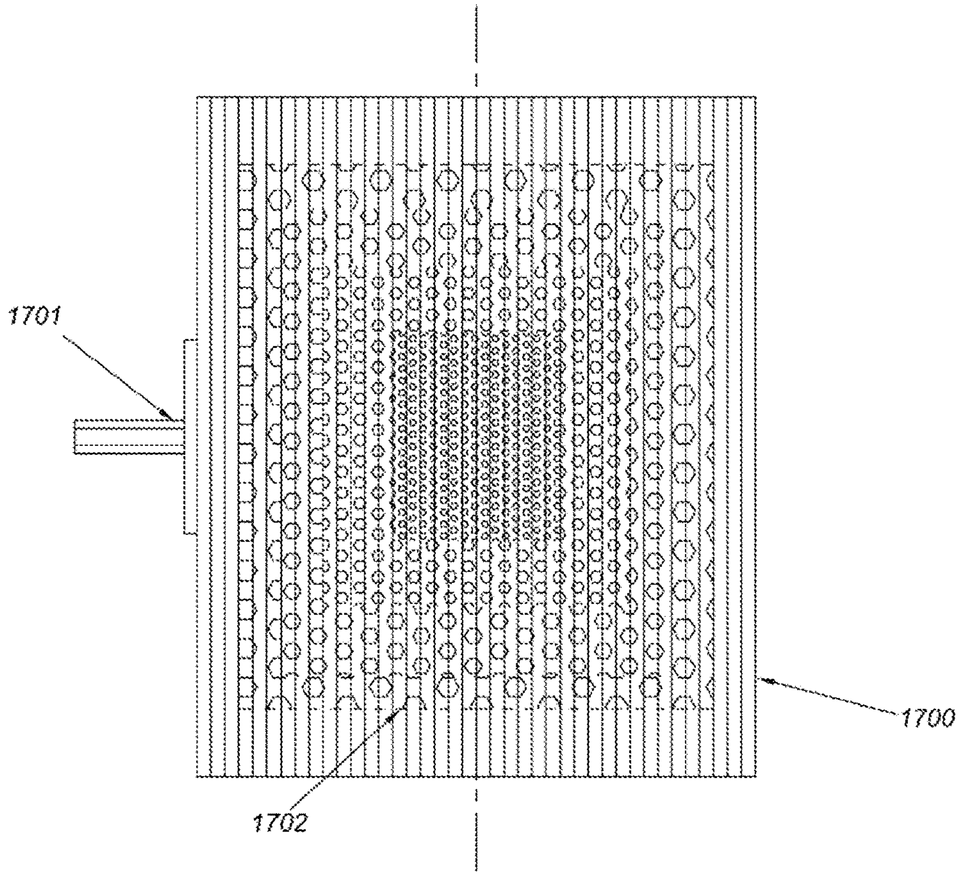
FIG. 33 is a schematic diagram of a cross-sectional structure of embodiment 17.

As shown in FIG. 33, this embodiment is a lens antenna, which includes the electromagnetic lens 1700 in embodiment 9 and an antenna oscillator 1701. The antenna oscillator 1701 is formed at the periphery of the winded body of the electromagnetic lens and is fixed on the non-lens part of the winded body. In this case, the antenna oscillator 1701 has a predesigned relative position and distance relative to the lens body 1702.

Embodiment 18

Figure 34:
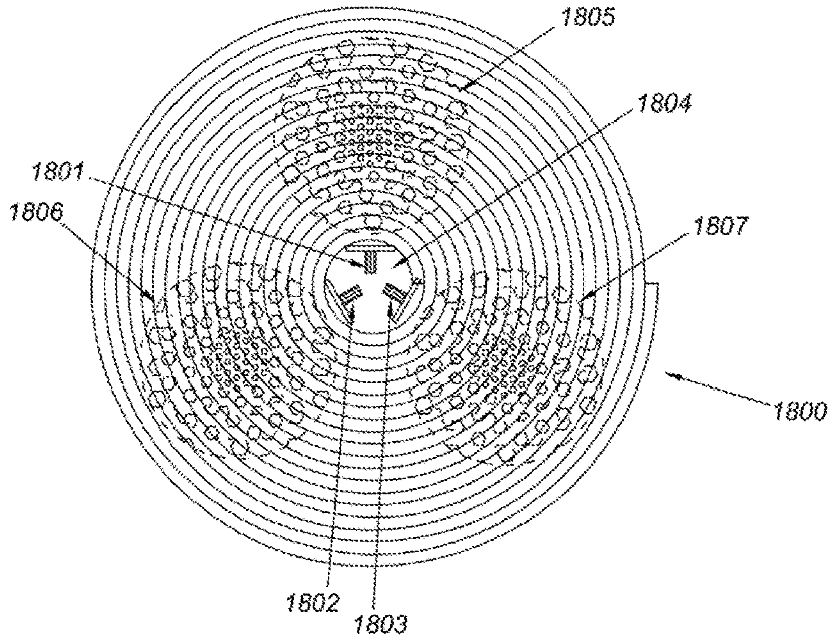
FIG. 34 is a schematic diagram of a top view structure of embodiment 18.

As shown in FIG. 34, this embodiment is a lens antenna, which includes the electromagnetic lens 1800 in embodiment 6 and three antenna oscillators 1801. The three antenna oscillators 1801, 1802 and 1803 are inside a through hole 1804 and fixed on the non-lens part of the winded body of the electromagnetic lens. In this case, each of the antenna oscillators 1801, 1802 and 1803 has a predesigned relative position and distance relative to a corresponding lens body 1805, 1806 or 1807.

The specification lists only the preferred embodiments of the present invention. All the hexagon filling patterns in the accompanying drawings only represent the areas covered by the dielectric material, not the shape of the dielectric material itself. Any equivalent technical transformation made under the working principle and idea of the present invention shall fall within the scope of protection of the present invention.

What is claimed is:

1. An electromagnetic lens, wherein the electromagnetic lens is a winded body made of a strip material, a dielectric material is distributed on a surface of and/or inside the strip material, and a dielectric constant of the dielectric material gradually changes in both a transverse direction and a longitudinal direction of the strip material; after the strip material is winded to be the winded body, the dielectric material is distributed in at least one artificially predetermined three-dimensional space range inside the winded body, and the three-dimensional space range with the dielectric material distributed is called a lens body; a part of the winded body besides the lens body is called a non-lens part; the winded body has or does not have the non-lens part; the dielectric constant of the lens body is not lower than the dielectric constant of the non-lens part; the dielectric constant of the lens body gets lower and lower in all directions from inside to outside of the lens body, and each direction from inside to outside of the lens body indicates a direction from a central area of the lens body to a boundary of the lens body.

2. The electromagnetic lens according to claim 1, wherein in the case that the electromagnetic lens includes only one lens body, a central axis of the lens body coincides with or is parallel to a central axis of the winded body; in the case that the electromagnetic lens includes two or more lens bodies, these lens bodies are arranged along or parallel to the central axis of the winded body.

3. The electromagnetic lens according to claim 1, wherein in the case that the electromagnetic lens includes two or more lens bodies, these lens bodies are arranged in a circumferential direction of the winded body.

4. The electromagnetic lens according to claim 1, wherein a tubular cavity is pre-provided in a central part of the cross section of the winded body, and the tubular cavity is filled with a rod-shaped part; in the case that the rod-shaped part has to pass through the lens body, a part of the rod-shaped part passing through the lens body has a dielectric constant distribution matching the lens body.

5. The electromagnetic lens according to claim 1, wherein a central part of the winded body is provided with a shaft for taking-up and winding the strip material, and a central axis of the shaft coincides with or almost coincides with a central axis of the winded body; in the case that the shaft has to pass through the lens body, a part of the shaft passing through the lens body has a dielectric constant distribution matching the lens body.

6. The electromagnetic lens according to claim 5, wherein both ends of the shaft are fixed ends of the electromagnetic lens of the present invention.

7. The electromagnetic lens according to claim 1, wherein the winded body is in a form of a cylinder, an elliptical cylinder, a prism, a capsule-shaped cylinder, a sphere or a tube.

8. The electromagnetic lens according to claim 1, wherein the lens body is in a form of a sphere, a rugby ball, a cylinder or a prism.

9. The electromagnetic lens according to claim 1, wherein in the case that the electromagnetic lens includes two or more lens bodies, these lens bodies are of different sizes from each other.

10. The electromagnetic lens according to claim 1, wherein in the case that the electromagnetic lens includes two or more lens bodies, these lens bodies are of different shapes from each other.

11. The electromagnetic lens according to claim 1, wherein the dielectric material is a sheet having a specific/unspecific shape, or a fiber having a specific length, or a three-dimensional part having a specific/unspecific shape.

12. The electromagnetic lens according to claim 1, wherein the dielectric material is first attached to a low dielectric constant film, and then the film is adhered to the surface of the strip material.

13. The electromagnetic lens according to claim 1, wherein in the case that the dielectric material is a fiber having a specific length or a three-dimensional part having a specific/unspecific shape, the dielectric material is wholly or partially inserted or embedded in the strip material.

14. The electromagnetic lens according to claim 1, wherein in the case that the lens body is in a form of a sphere, the distribution of the dielectric material in the whole lens body conforms to a step approximation law of a classical model of a Luneberg lens.

15. The electromagnetic lens according to claim 1, wherein the winded body is formed by winding a piece of strip material from one end or middle of the piece of strip material.

16. The electromagnetic lens according to claim 1, wherein the winded body is formed by combining two or more pieces of strip material at their respective ends and then winding them at a same time, or is formed by combining two or more pieces of strip material at their respective central parts and then winding them at a same time.

17. The electromagnetic lens according to claim 1, wherein the dielectric material is distributed inside the lens body according to a material distribution law, a density distribution law, or a combination of the material distribution law and the density distribution law.

18. The electromagnetic lens according to claim 1, in the case that the lens body is divided into a number of dielectric constant step layers; a dielectric constant step layer having a higher dielectric constant value completely wraps a dielectric constant step layer having a lower dielectric constant value; respective dielectric constant values of adjacent dielectric constant step layers are stepped; and the dielectric constant of the lens body decreases in a step manner in a direction from inside to outside of the lens body.

19. The electromagnetic lens according to claim 18, wherein if the strip material is unwinded, the dielectric material is distributed on a specific plane area of the strip material, such a specific plane area is called a dielectric distribution area; the dielectric distribution area is divided into a number of sub-distribution areas, and a sub-distribution area having a higher dielectric constant is half or fully surrounded by a sub-distribution area having a lower dielectric constant; when the strip material is winded from a sub-distribution area having a highest dielectric constant, each sub-distribution area corresponds to a dielectric constant step layer of the resulting lens body.

20. The electromagnetic lens according to claim 19, wherein the dielectric distribution area is in a form of a triangle or a rectangle.

21. The electromagnetic lens according to claim 1, wherein the winded body has an adhesive layer between winding layers, or a wrapping layer on the outside the winded body.

22. A lens antenna, comprising an antenna oscillator and the electromagnetic lens according to claim 1, a non-lens part is formed on the electromagnetic lens according to claim 1, and the antenna oscillator is fixed on the non-lens part.

* * * * *